United States Patent
Back et al.

(10) Patent No.: US 12,273,954 B2
(45) Date of Patent: Apr. 8, 2025

(54) UE OPERATION METHOD RELATED TO RELAY UE IN WIRELESS COMMUNICATION SYSTEM

(71) Applicant: LG ELECTRONICS INC., Seoul (KR)

(72) Inventors: Seoyoung Back, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 424 days.

(21) Appl. No.: 17/904,205

(22) PCT Filed: Feb. 15, 2021

(86) PCT No.: PCT/KR2021/001879
§ 371 (c)(1),
(2) Date: Aug. 12, 2022

(87) PCT Pub. No.: WO2021/162506
PCT Pub. Date: Aug. 19, 2021

(65) Prior Publication Data
US 2023/0079552 A1    Mar. 16, 2023

Related U.S. Application Data

(60) Provisional application No. 63/137,667, filed on Jan. 14, 2021.

(30) Foreign Application Priority Data

Feb. 12, 2020   (KR) .......................... 10-2020-0017207
Feb. 13, 2020   (KR) .......................... 10-2020-0017860
Feb. 28, 2020   (KR) .......................... 10-2020-0025259

(51) Int. Cl.
*H04W 8/00*     (2009.01)
*H04W 40/22*    (2009.01)
*H04W 64/00*    (2009.01)

(52) U.S. Cl.
CPC .......... *H04W 8/005* (2013.01); *H04W 40/22* (2013.01); *H04W 64/003* (2013.01)

(58) Field of Classification Search
CPC .... H04W 8/005; H04W 40/22; H04W 64/003
See application file for complete search history.

(56) References Cited

U.S. PATENT DOCUMENTS
2018/0368048 A1   12/2018   Tsuchie

FOREIGN PATENT DOCUMENTS
KR    10-1956495    3/2019

OTHER PUBLICATIONS

PCT International Application No. PCT/KR2021/001879, International Search Report dated Jun. 4, 2021, 3 pages.

(Continued)

*Primary Examiner* — Justin Y Lee
(74) *Attorney, Agent, or Firm* — LEE, HONG, DEGERMAN, KANG & WAIMEY

(57) ABSTRACT

One embodiment relates to a remote UE operation method in a wireless communication system, the method comprising steps of in which: a remote UE receives at least one discovery message; and a relay UE is selected on the basis of the at least one discovery message, wherein: the discovery message includes information related to the minimum communication range (MCR) of a source UE; the remote UE is included in the range of the MCR; and the selected relay UE has a signal strength greater than or equal to that of a preset value and is included in the range of the MCR.

14 Claims, 27 Drawing Sheets

(56) References Cited

OTHER PUBLICATIONS

Interdigital Inc. et al., "Need for Range Restriction for LCP," R2-1914867, 3GPP RAN WG2 Meeting #108, Nov. 2019, 5 pages.
Lenovo et al., "Discussion on physical layer procedures for NR sidelink," R1-1912325, 3GPP TSG RAN WG1 #99, Nov. 2019, 13 pages.
Sequans Communications, "On HARQ procedure for NR sidelink," R1-1913012, 3GPP TSG RAN WG1 Meeting #99, Nov. 2019, 8 pages.

(a)

(b)

(a)

(b)

(a)

(b)

(a)

(b)

UE OPERATION METHOD RELATED TO RELAY UE IN WIRELESS COMMUNICATION SYSTEM

CROSS-REFERENCE TO RELATED APPLICATION(S)

This application is the National Stage filing under 35 U.S.C. 371 of International Application No. PCT/KR2021/001879, filed on Feb. 15, 2021, which claims the benefit of earlier filing date and right of priority to Korean Application Nos. 10-2020-0017207, filed on Feb. 12, 2020, 10-2020-0017860, filed on Feb. 13, 2020, and 10-2020-0025259, filed on Feb. 28, 2020, and also claims the benefit of U.S. Provisional Application No. 63/137,667, filed on Jan. 14, 2021, the contents of which are all hereby incorporated by reference herein in their entireties.

TECHNICAL FIELD

The following description relates to a wireless communication system and, more particularly, to a method and apparatus related to a sidelink relay user equipment (UE).

BACKGROUND ART

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

Embodiment(s) provide a method of selecting a relay UE related to a minimum communication range (MCR) in sidelink.

Technical Solution

According to an aspect of the present disclosure, provided herein is an operation method of a remote user equipment (UE) in a wireless communication system, including receiving at least one discovery message by the remote UE; and selecting a relay UE based on the at least one discovery message. The discovery message includes information related to a minimum communication range (MCR) of a source UE. The remote UE is included in the MCR, and the selected relay UE has a signal strength equal to or greater than a preset value and is included in the MCR.

In another aspect of the present disclosure, provided herein is a remote user equipment (UE) in a wireless communication system, including at least one processor; and at least one computer memory operably connectable to the at least one processor and storing instructions that, when executed, cause the at least one processor to perform operations. The operations include receiving at least one discovery message; and selecting a relay UE based on the at least one discovery message. The discovery message includes information related to a minimum communication range (MCR) of a source UE. The remote UE is included in the MCR, and the selected relay UE has a signal strength equal to or greater than a preset value and is included in the MCR.

In another aspect of the present disclosure, provided herein is a processor for performing operations for a remote user equipment (UE) in a wireless communication system. The operations include receiving at least one discovery message; and selecting a relay UE based on the at least one discovery message. The discovery message includes information related to a minimum communication range (MCR) of a source UE. The remote UE is included in the MCR, and the selected relay UE has a signal strength equal to or greater than a preset value and is included in the MCR.

In another aspect of the present disclosure, provided herein is a non-volatile computer readable storage medium storing at least one computer program including instructions that, when executed by at least one processor, cause the at least one processor to perform operations for a user equipment (UE). The operations include receiving at least one discovery message; and selecting a relay UE based on the at least one discovery message. The discovery message includes information related to a minimum communication range (MCR) of a source UE. The remote UE is included in the MCR, and the selected relay UE has a signal strength equal to or greater than a preset value and is included in the MCR.

The discovery message may include information about a location of one of the source UE and a base station.

The remote UE may preferentially select a relay UE located at a position obtained by applying a predetermined offset to half of the MCR.

The discovery message may include information indicating that the MCR is applied to the discovery message, and the remote UE may skip transmission of the discovery message to a higher layer.

The remote UE may transmit only negative acknowledgement (NACK) among acknowledgement (ACK) and NACK based on the remote UE belonging to the MCR and skip transmission of both ACK and NACK based on the remote UE being out of the MCR.

The MCR may be configured on a service basis.

Advantageous Effects

According to an embodiment, overall link quality may become more stable by selecting a relay. For a specific service, when a remote UE does not need to transmit and receive the service even through a relay out of an MCR, a problem of performing unnecessary relay selection may be solved.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, $5^{th}$ generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
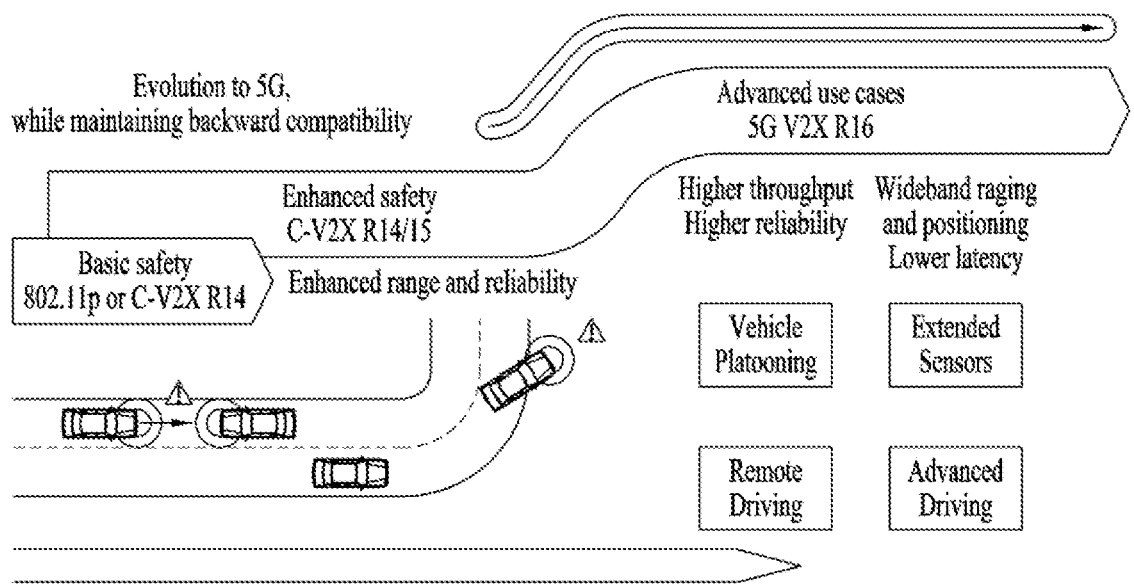
FIG. 1 is a diagram comparing vehicle-to-everything (V2X) communication based on pre-new radio access technology (pre-NR) with V2X communication based on NR.
Figure 2:
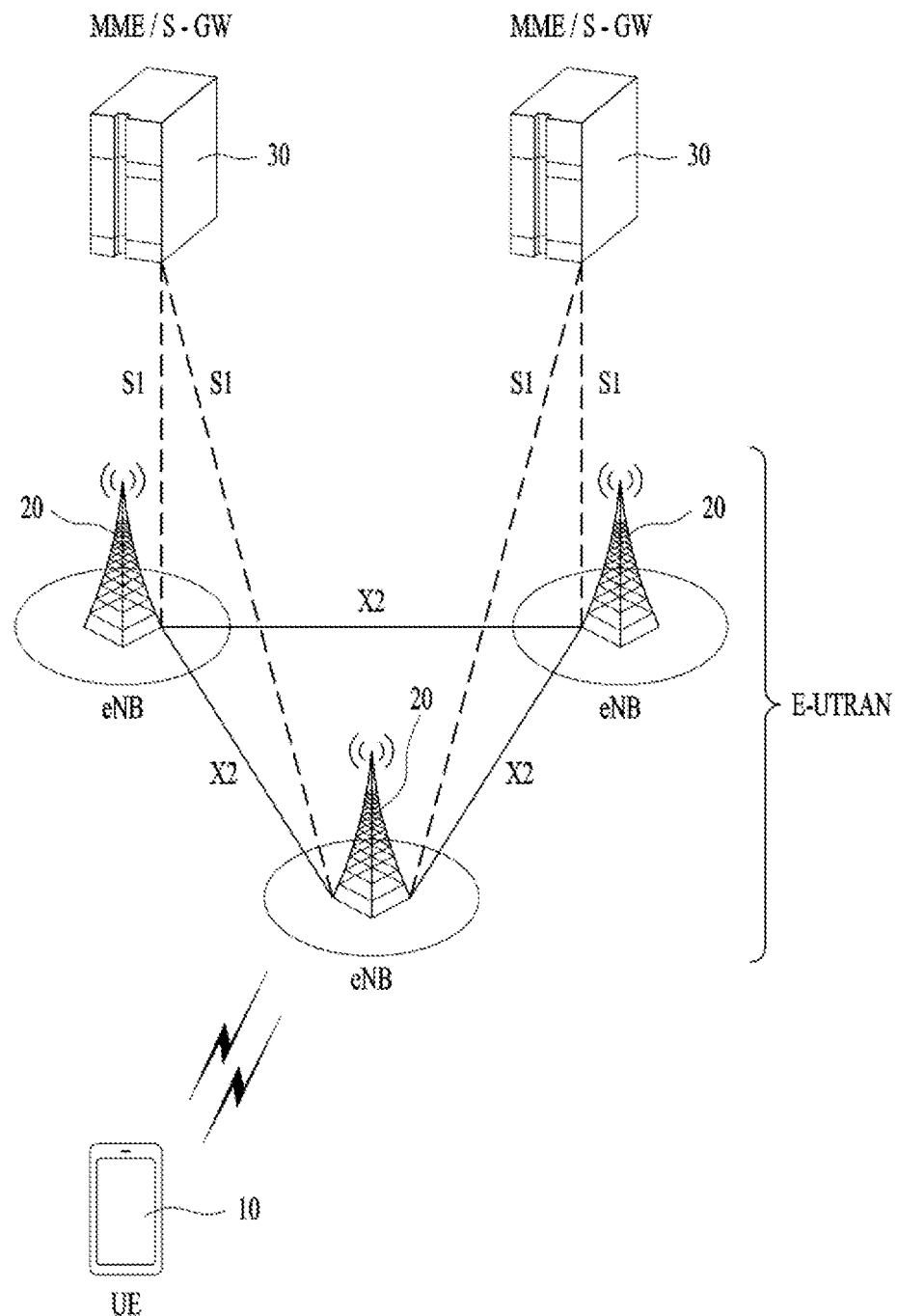
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE10 may be fixed or mobile, and may also be referred to as a mobile station (MS), user terminal (UT), subscriber station (SS), mobile terminal (MT), or wireless device. An eNB 20 is a fixed station communication with the UE10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
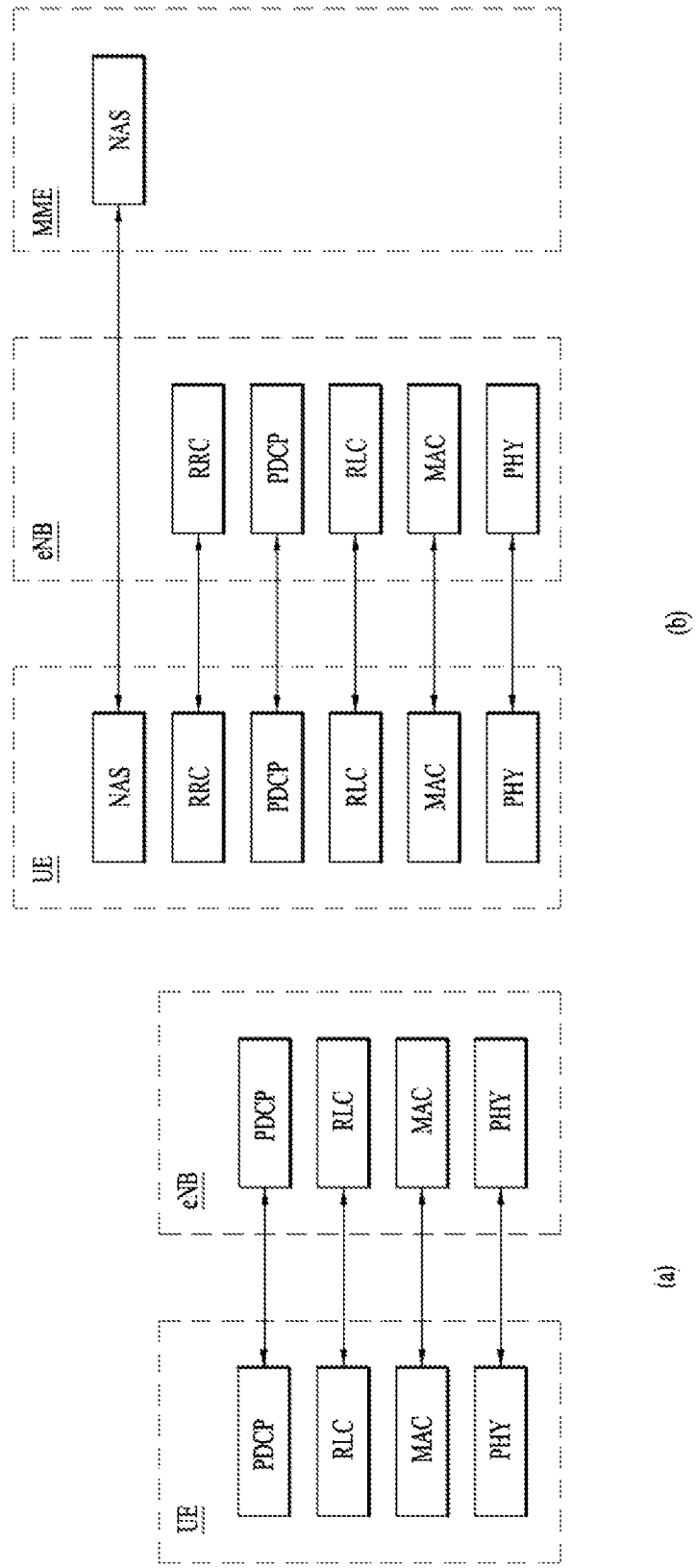
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
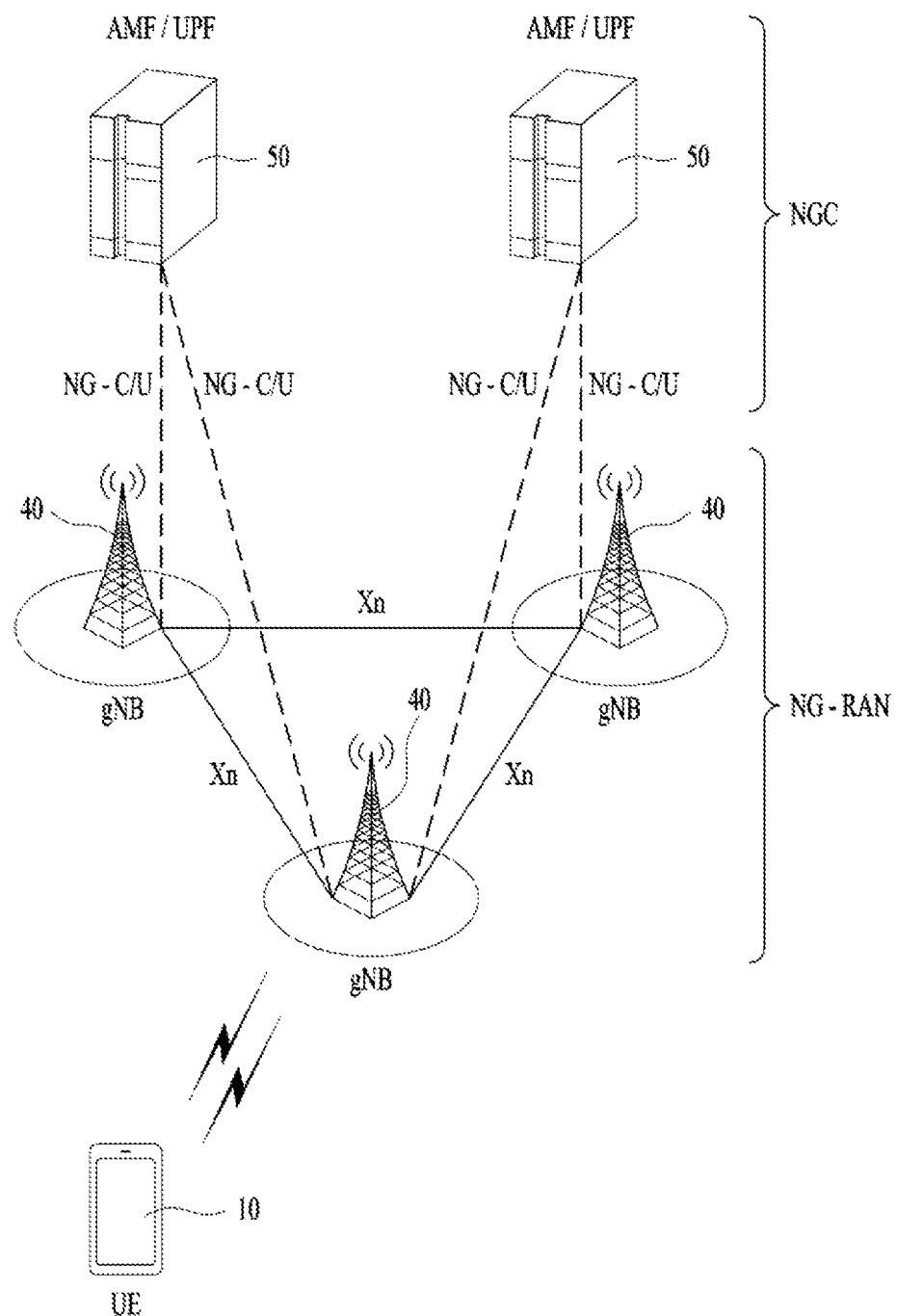
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
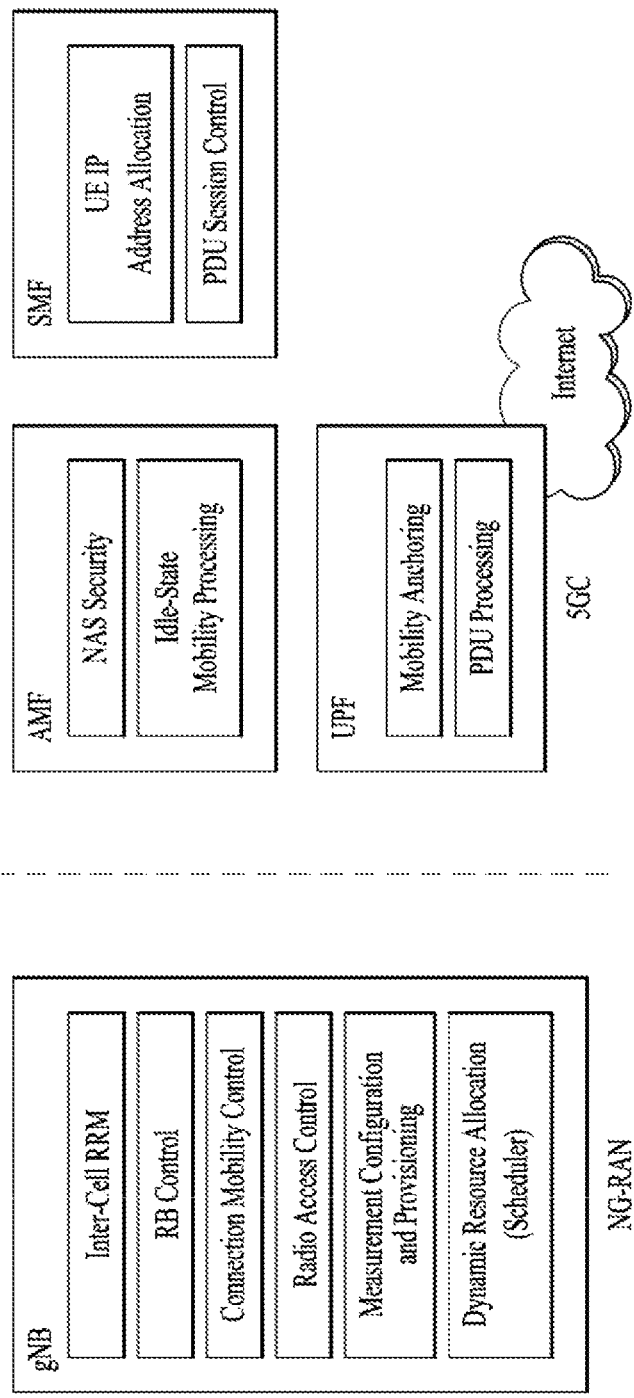
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
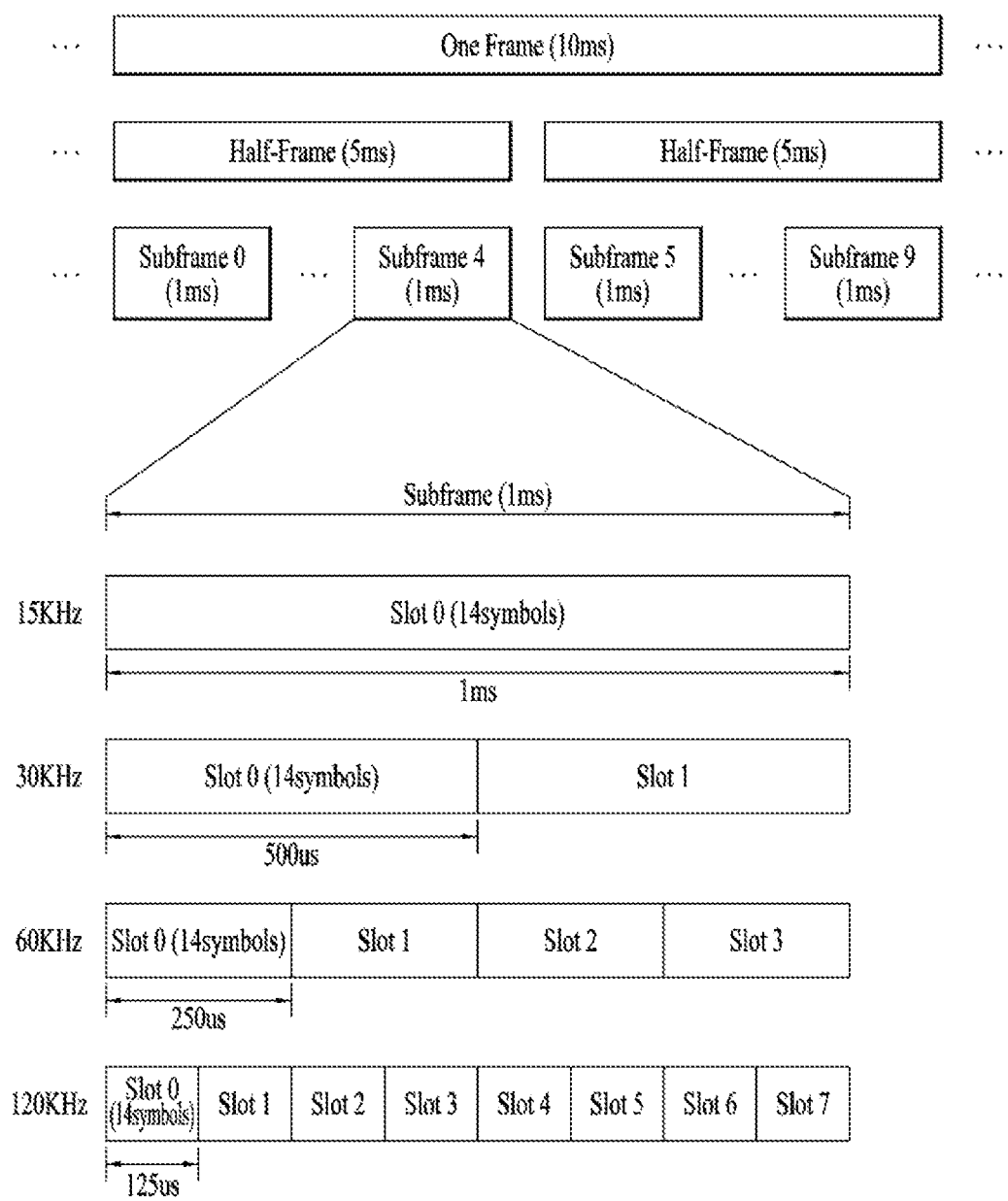
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in Table 3. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As mentioned above, the numerals in a frequency range may be changed in the NR system. For example, FR1 may range from 410 MHz to 7125 MHz as listed in Table 4. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
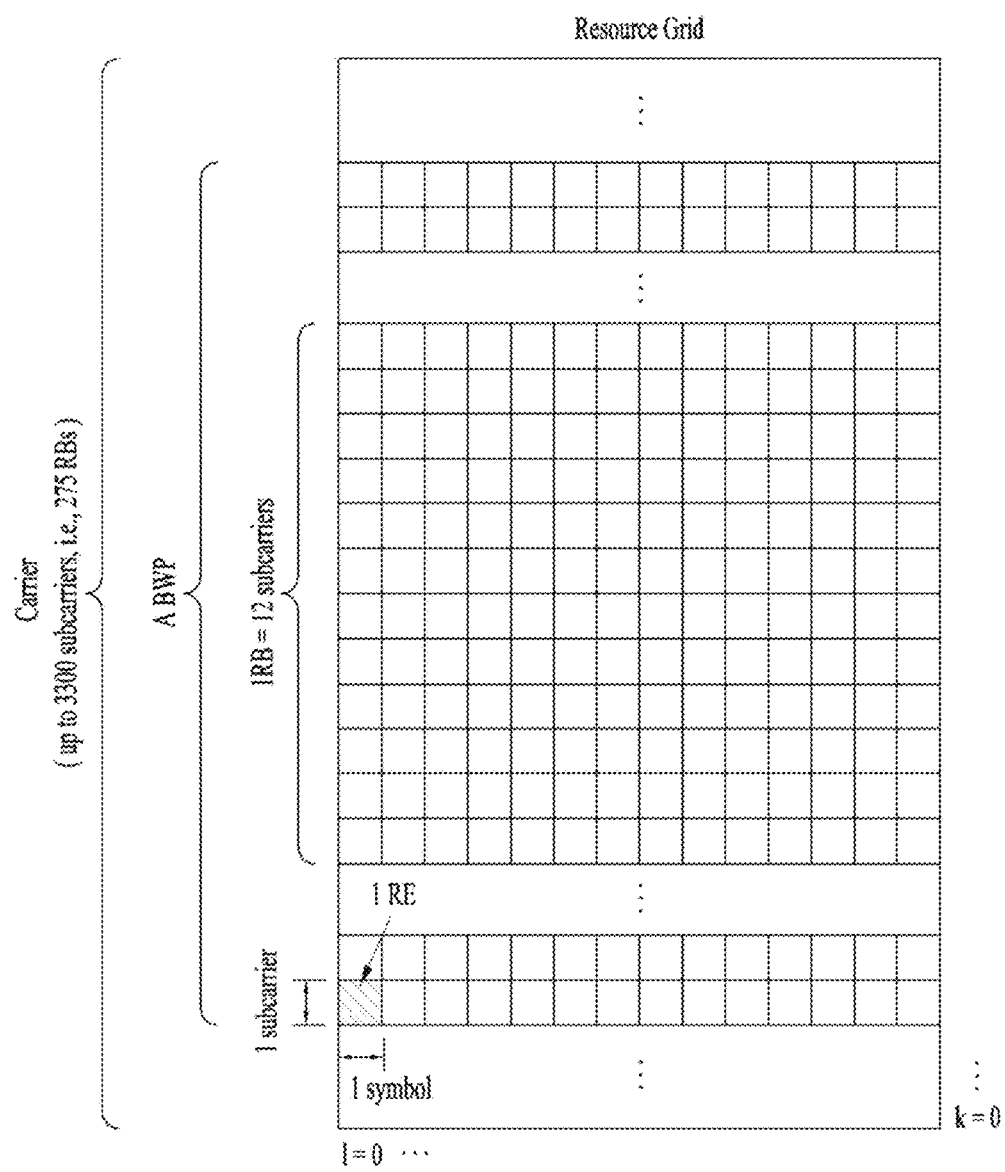
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
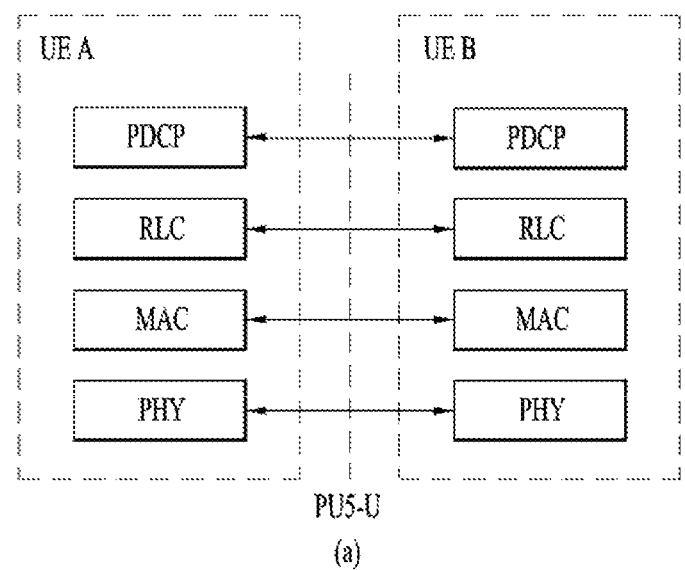
FIG. 8 is a diagram illustrating radio protocol architectures for sidelink (SL) communication according to an embodiment of the present disclosure.
Figure 8:
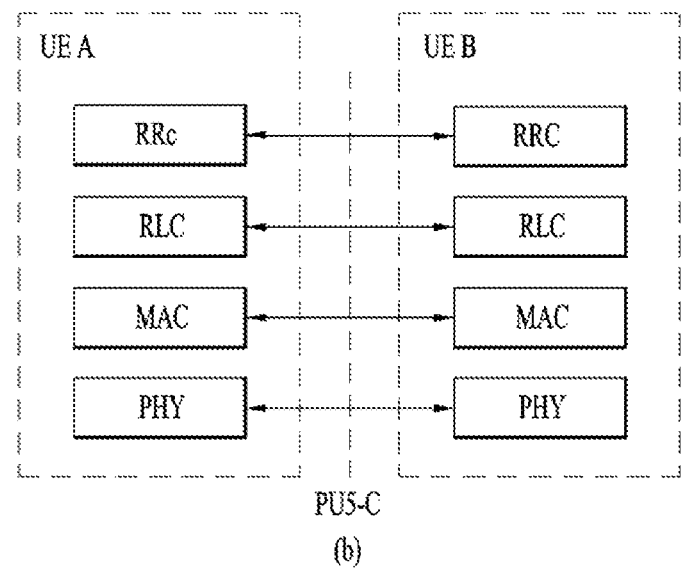

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
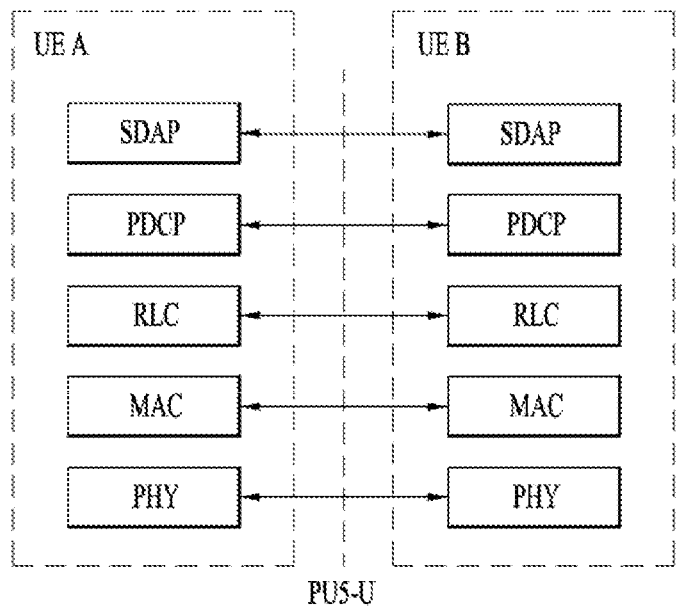
FIG. 9 is a diagram illustrating radio protocol architectures for SL communication according to an embodiment of the present disclosure.
Figure 9:
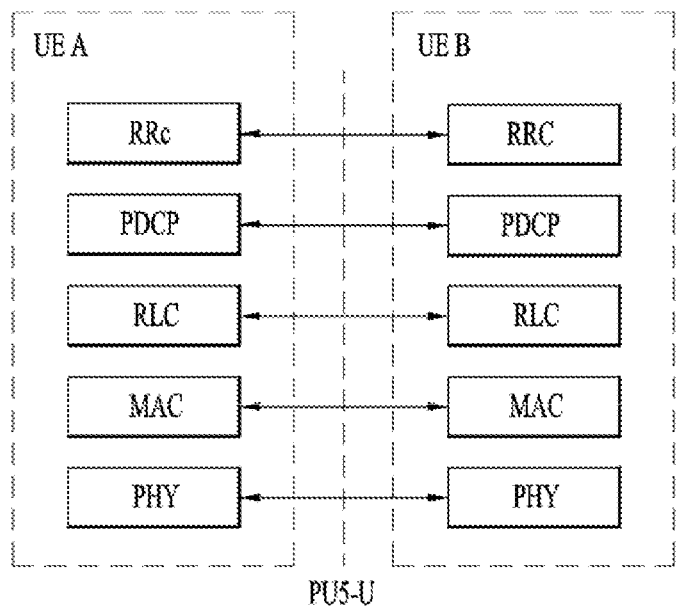

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
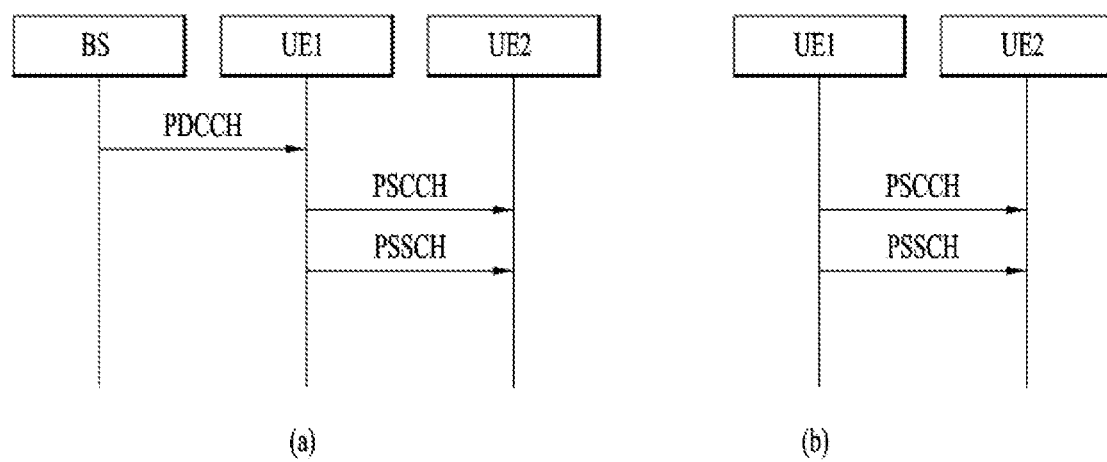
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
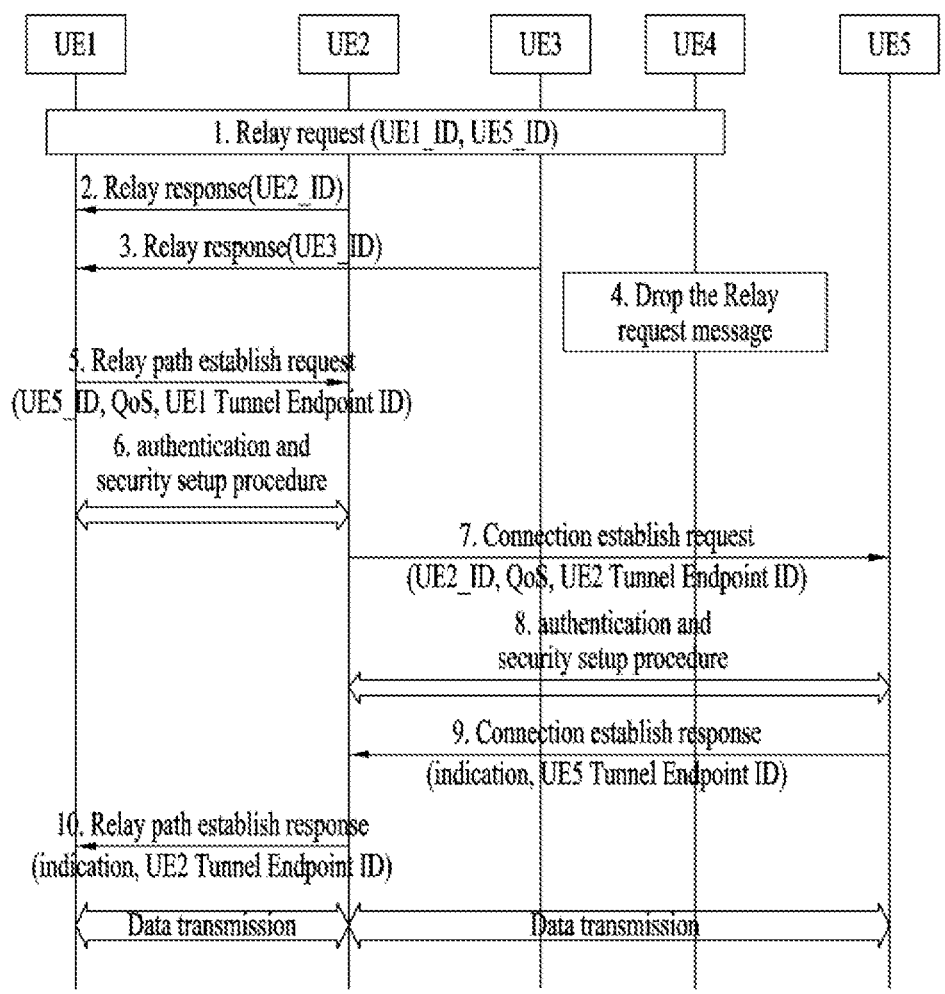
FIGS. 11 to 20 are diagrams illustrating embodiment(s)

When transmission/reception is performed through UE-to-UE relay, there is a problem of selecting a relay suitable for transmission/reception. FIG. 11 illustrates a UE-to-UE path establishment procedure disclosed in TR 23.703. A source UE UE1 broadcasts a 'relay request' including an ID thereof (ID1 ID) and a destination ID (ID5 ID). Among remote UEs that have heard the broadcast, candidate relay UEs UE2, UE3, and UE4 having the capability to serve as a relay transmit 'relay response' signals including IDs thereof to UE1 that has requested relaying upon determining that candidate relay UEs UE2, UE3, and UE4 are capable of operating as a relay between UE1 and UE5 (e.g., signal strength (e.g., RSRP) received from UE1 and UE5 is within a predetermined threshold range). In FIG. 11, it may be seen that only UE2 and UE3 among the candidate relay UEs have transmitted the 'relay response'. Upon receiving the 'relay response' from the candidate relay UEs, the source UE UE1 may randomly select any one of the responding candidate relay UEs for load balance between the relay UEs. The source UE UE1 transmits a 'path establish request' to the relay UE UE2 selected thereby. When an 'authentication and security setup procedure' between the source UE UE1 and the relay UE UE2 is completed, it may be considered that a path has been established between the source UE UE1 and the relay UE UE2. Similarly, the relay UE UE2 transmits a 'connection establish request' to the destination UE UE5, establishes a path through the 'authentication and security setup procedure', and informs the source UE UE1 that the path has been established.

Sidelink Minimum Communication Range (MCR)

Mode 1 of a current sidelink groupcast operation supports an MCR-based NACK-only operation. The MCR-based NACK-only operation is applied to a service that does not specify a group member size or a group member ID. Upon failing to receive a message within a specific distance, a reception UE feeds back NACK. If the reception UE is present out of a specific distance, the reception UE does not transmit ACK/NACK. This method serves to improve the reliability of a service within a determined range with respect to a service that does not specify IDs of group members and the number of group members. The MCR is a value determined by a higher layer according to services. When several services are provided, a maximum MCR value of the services is applied as a representative value. The MCR value is information included in SCI of a physical layer. A transmission UE transmits location information thereof (e.g., zone ID) and distance information thereof (e.g., MCR) by including the same in the SCI. If the reception UE is present within the MCR from the transmission UE as a result of decoding the received SCI and is incapable of decoding a received message, the reception UE may transmit a NACK response.

In summary, the MCR of RAN1 is applied during transmission of sidelink groupcast. When the reception UE which is present within the MCR from the transmission UE is incapable of decoding a message, the reception UE may transmit NACK. The MCR is applied to a service which does not specify a group member size or a group member ID. When the MCR is applied, reliable communication may be expected within the MCR.

The above-described concept of the MCR may be applied to selection of a relay UE. The MCR refers to a minimum distance within which a service desires to be reliably transmitted. Even during selection of the relay UE, selection of the relay UE considering the MCR between a source UE and a destination UE may be helpful to reliably transmit data. Hereinbelow, a relay selection method to which the MCR is applied will be described in detail.

Figure 12:
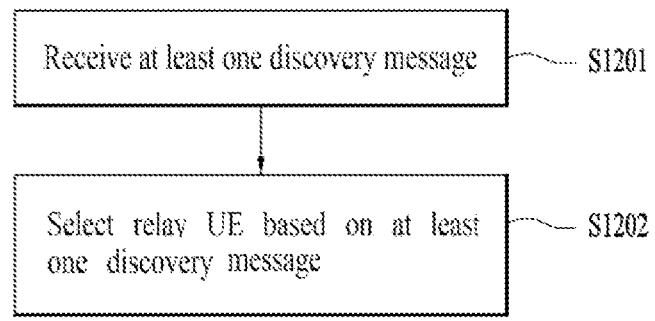

A remote UE according to an embodiment may receive at least one discovery message (S1201 of FIG. 12). The remote UE may select a relay UE based on the at least one discovery message (S1202 of FIG. 12). The discovery message may include information related to the MCR of a source UE and/or location information of one of a source UE and a BS. The remote UE may be included in the MCR, and the selected relay UE may have signal strength of a preset value or more and may be included in the MCR.

That is, in UE-to-network relay, a relay UE supports a relaying operation only for UEs belonging to a specific distance from a gNB. In UE-to-UE relay, a relay UE supports a relaying operation only for UEs belonging to a specific distance from a source UE.

FIG. 13(a) illustrates UE-to-network relay based on an MCR and FIG. 13(b) illustrates UE-to-UE relay based on the MCR. Referring to FIG. 13(a), a relay UE transmits a discovery message including MCR information and location information of a gNB (or remote source UE). Upon receiving the discovery message, a remote UE selects the relay UE only when the remote UE belongs to an MCR from the gNB (or remote source UE). The remote (destination) UE performs communication through the relay UE within a distance in which the remote UE desires to use a service of the gNB (or remote source UE).

In regard to FIG. 13(b), when a gNB is not an entity for generating data and a third UE connected to the gNB is a source UE, the MCR is based on the location of the source UE. A remote UE may preferentially select a relay UE located at a position obtained by applying a predetermined offset to half of the MCR. Upon selecting a relay UE, if the remote UE preferentially selects a relay UE located at a position of ½*MCR+(−)offset, there is an advantage of selecting a relay UE having overall good link quality (i.e. Uu link quality with sidelink).

The discovery message may be related to either discovery model A or discovery model B. Specifically, when discovery model A is used by applying the MCR to UE-to-network relay, a relay UE may transmit a discovery message including the location of a source (gNB or a third UE connected to the gNB) and MCR information or broadcast/groupcast a discovery message including the location of the relay UE and modified MCR information. Upon receiving the discovery message, the remote UE may select the relay UE as a relay UE thereof when the remote UE is within the MCR. Alternatively, when discovery mode B is used by applying the MCR to UE-to-network relay, the remote UE may transmit a solicitation message including location information thereof and MCR information. Upon receiving the solicitation message, a candidate relay UE may transmit a response message only when the candidate relay UE belongs to the MCR in consideration of the location thereof, a distance from the gNB, or a third destination UE connected to the gNB.

The remote UE does not perform an operation of transmitting only NACK among ACK and NACK based on the remote UE belonging to the MCR and not transmitting both ACK and NACK based on the remote UE not belonging to the MCR. More specifically, the MCR considered during selection of a relay needs to be distinguished from an existing MCR operation used in groupcast. For example, when MCR information is included in a discovery message used for relay (re)selection, remote UEs receiving the display message do not need to perform a NACK-only operation such as the existing MCR operation. To distinguish between the existing NACK-only MCR operation and an MCR operation for relay reselection, a method of indicating the discovery message in a reservation field of SCI of a physical layer or transmitting the discovery message using a discovery dedicated pool is needed. When the physical layer indicates the discovery message to which the MCR is applied, a remote UE located out of the MCR does not need to transmit the discovery message to a higher layer. That is, the discovery message may include information indicating that the MCR has been applied to the discovery message and the remote UE receiving the discovery message may not transmit the discovery message to the higher layer.

The MCR may be configured on a service basis. It may be assumed that the type of a relaying service supported by the relay UE is (pre-)configured.

Figure 14:
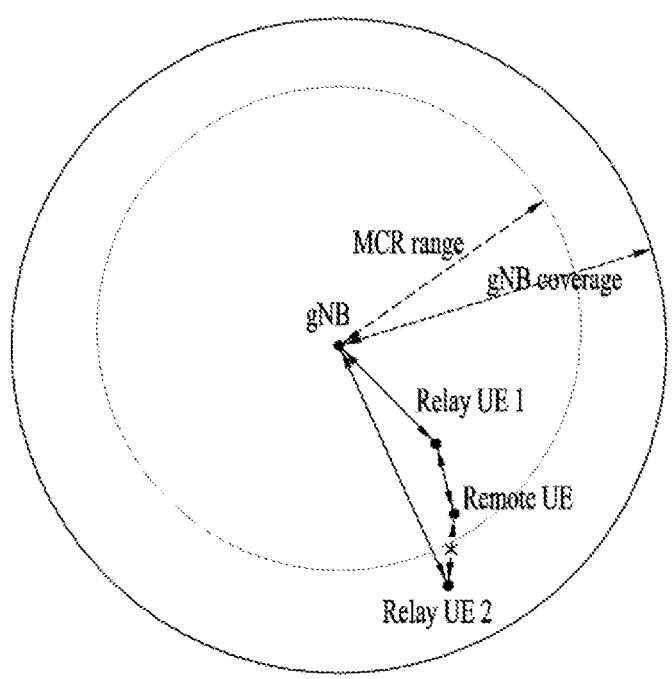

In summary, the MCR may be considered during selection of a relay UE. The relay UE may be selected within a range satisfying MCR requirements of a service. That is, upon transmitting a discovery message, the relay UE transmits the discovery message including location information of a gNB. Upon receiving the discovery message, a remote UE may select the relay UE only when the remote UE belongs to the MCR from the gNB. When the relay UE is selected by applying the MCR, the MCR may be applied to a discovery procedure. The relay UE may modify an MCR value and transmit a discovery message including location information thereof and the modified MCR value. In this case, the relay UE transmits a discovery message including location information of a source UE and MCR information. That is, during selection of a relay UE as illustrated in FIG. 14, if a remote UE selects a relay UE UE1 located within an MCR, overall link quality may be more stable as compared with the case in which the remote UE selects a relay UE only using sidelink signal strength (i.e., selection of a relay UE UE2). In addition, in some cases, for a specific service, the remote UE does not need to transmit and receive the service even through a relay UE out of the MCR. Then a problem of performing unnecessary relay selection according to conventional relay selection may be solved.

In relation to the above description, a remote UE may include at least one processor; and at least one computer memory operably connectable to the at least one processor and storing instructions that, when executed, cause the at least one processor to perform operations. The operations may include receiving at least one discovery message; and selecting a relay UE based on the at least one discovery message. The discovery message may include information related to an MCR of a source UE. The remote UE may be included in the MCR, and the selected relay UE may have a signal strength equal to or greater than a preset value and may be included in the MCR.

A processor may perform operations for a remote UE. The operations may include receiving at least one discovery message; and selecting a relay UE based on the at least one discovery message. The discovery message may include information related to an MCR of a source UE. The remote UE may be included in the MCR, and the selected relay UE may have a signal strength equal to or greater than a preset value and may be included in the MCR.

A non-volatile computer readable storage medium may store at least one computer program including instructions that, when executed by at least one processor, cause the at least one processor to perform operations for a UE. The operations may include receiving at least one discovery message; and selecting a relay UE based on the at least one discovery message. The discovery message may include information related to an MCR of a source UE. The remote UE may be included in the MCR, and the selected relay UE may have a signal strength equal to or greater than a preset value and may be included in the MCR.

Various embodiments of relay selection considering the MCR will be continuously described with reference to FIGS. 15 to 17.

Figure 15:
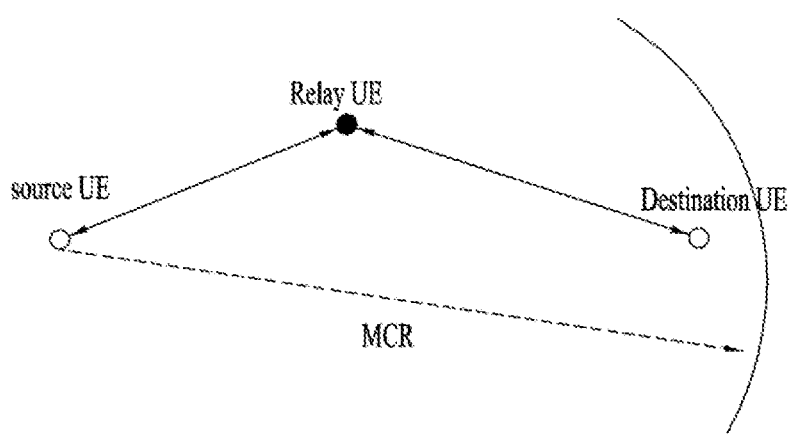

FIG. 15 illustrates UE-to-UE relay when the MCR is demanded. A packet transmitted by a source UE should be capable of reaching a destination UE while satisfying target reliability within the MCR. If it is desired to select a relay UE satisfying MCR requirements, the following restrictions may be generated upon selecting the relay UE.

The source UE may select the relay UE within an MCR or MCR+offset (in consideration of increase of coverage due to relay) of a transmission packet.

Figure 16:
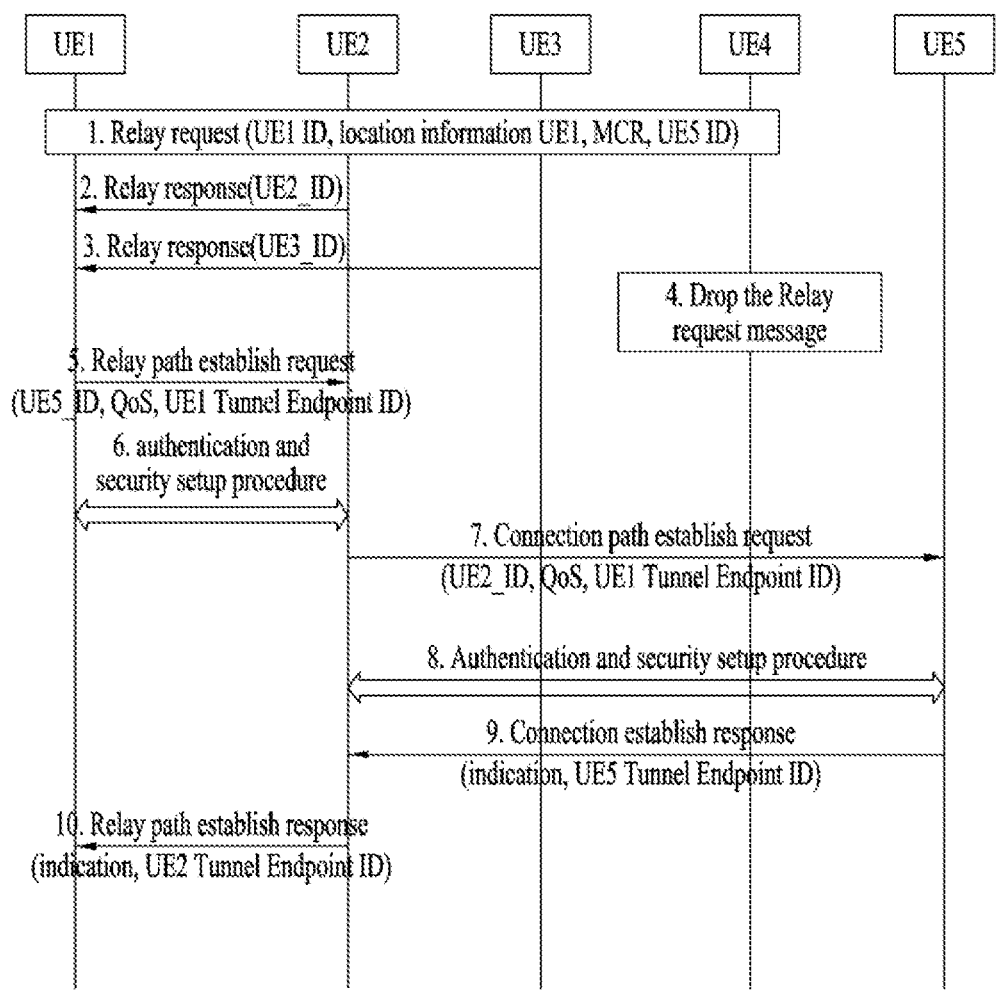

For example, as illustrated in FIG. 16, when a source UE UE1 broadcasts a 'relay request', the source UE broadcasts the relay request including location information thereof and an MCR value demanded by a packet (MCR of FIG. 16) in addition to an ID thereof (UE1 ID) and an ID of a destination UE (UE5 ID). Upon receiving the relay request, candidate relay UEs UE2, UE3, and UE4 check whether signal strength (SL RSRP) received from the source UE and the destination UE is within a predetermined threshold range so that the candidate relay UEs UE2, UE3, and UE4 may operate as a proper relay UE between the source UE and the destination UE. In this case, the signal threshold value used to determine whether the candidate relay UE may operate as a relay UE may be a value received during paging from a system information block (SIB) or may be a preconfigured value. Upon confirming that the relay UE may operate as the relay UE between the source UE and the destination UE through signal strength, the relay UE transmits a 'relay response' to the source UE UE1 only when the relay UE belongs to an MCR or MCR+/−offset range from the source UE. Here, the offset value refers to an added distance value that may allow the reliability of MCR requirements or a distance value determined based on increased coverage due to relay. Since coverage may increase due to use of the relay UE, the MCR+offset range may be considered or the location of the relay UE may be limited to the MCR-offset range for more reliable signal transmission.

Upon receiving the 'relay response' message, the source UE may perform path establishment by selecting one relay UE (randomly or a relay UE having the best signal strength or having signal strength belonging to a specific threshold range) from among candidate relay UEs that have transmitted the 'relay response' message.

Figure 17:
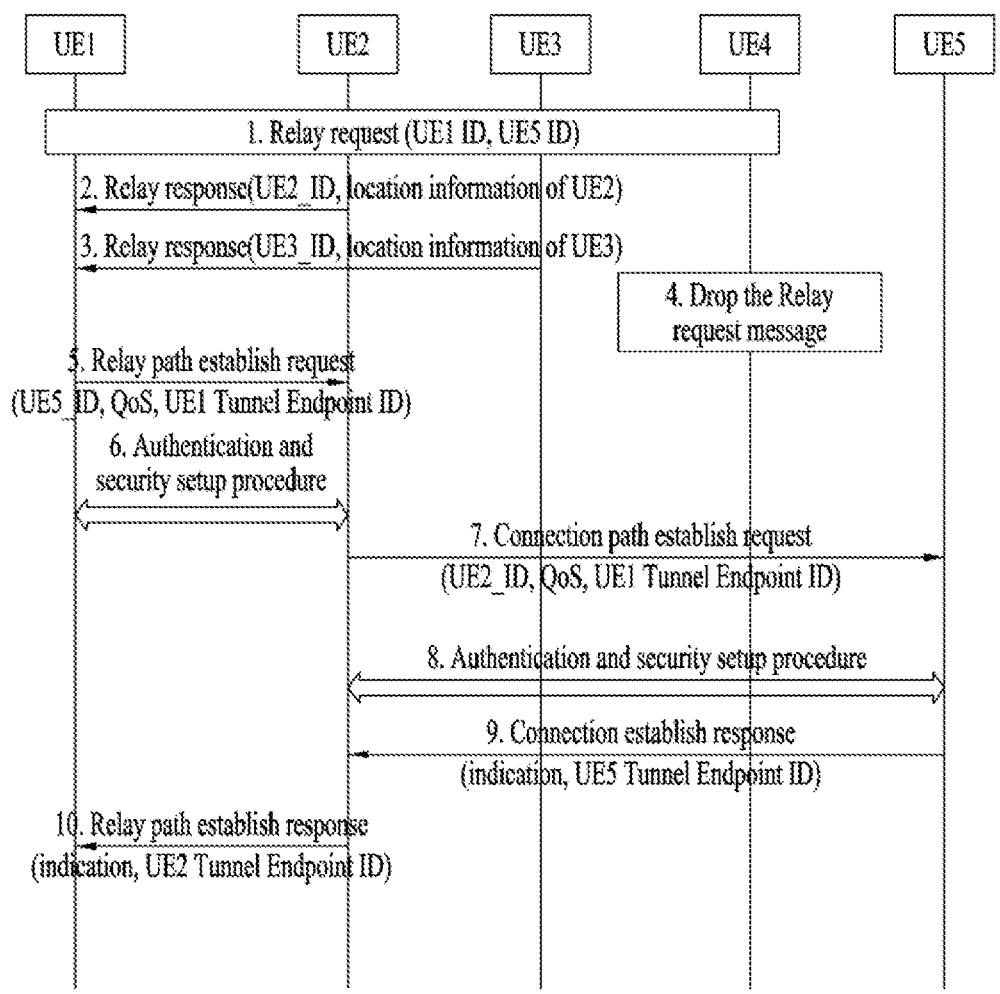

In FIG. 17, it is assumed that UE2 belongs to the MCR.

Referring to FIG. 17, when a source UE UE1 broadcasts a 'relay request', the source UE UE1 broadcasts the relay request including an ID thereof (UE1 ID) and a destination ID (UE5 ID). Upon receiving the relay request, candidate relay UEs UE2, UE3, and UE4 transmit 'relay response' messages including location information thereof to the source UE if it is determined that the candidate relay UEs UE2, UE3, and UE4 are suitable as a relay UE (e.g., when SL RSRP received from the source UE and the destination UE belongs to a determined threshold range). The threshold value may be a value received during paging from an SIB or may be a preconfigured value. Upon receiving the relay response messages, the source UE may perform 'path establishment' by selecting a relay UE (randomly or a relay UE having the best signal strength or having signal strength belonging to a specific threshold range) from among candidate relay UEs which are present within an MCR or MCR+/−offset range.

Meanwhile, in order to perform reliable packet transmission to a destination UE within an MCR using a relay, a source UE should denote the location thereof in a transmission packet. As a method of denoting the location information in the transmission packet, the location information of the source UE may be denoted in second-stage SCI (second SCI) of a physical layer. A destination UE which has received a packet requiring the MCR, transmitted by the source UE through a relay UE, may identify the location information of the source UE included in the second SCI and transmit ACK/NACK when a distance between the destination UE and the source UE is within the MCR or an error range of the MCR. On the other hand, in the same case, when the destination UE is out of the MCR or the error range of the MCR, the destination UE may omit transmission of ACK/NACK.

When the destination UE transmits NACK for a packet requiring the MCR, a relay UE instead of the source UE may perform retransmission. Even in a UE-to-UE relay situation, the source UE may perform retransmission of the packet as in general sidelink communication. However, when the relay UE retransmits the packet, the total amount of resources used may be reduced and gain may be obtained in terms of latency. In this way, the operation of performing retransmission by the relay UE when NACK occurs while communication is performed in a situation requiring the MCR may be applied regardless of a cast type (unicast, groupcast, multicast, or broadcast).

In UE-to-UE relay, it may be assumed that the source UE and the destination UE may identify presence of each other or at least the source UE is aware of presence of the destination UE, before the source UE broadcasts a 'relay request' message. This is because the 'relay request' message transmitted by the source UE has already included an ID of the destination UE. That is, it may be assumed that the source UE uses the relay UE when the source UE desires mutual communication with higher transmission rate and/or better reliability in a state that the source UE recognizes the destination UE with low transmission rate (e.g., QPSK modulation) or low reliability.

To support MCR requirements in this operation, when each of the source destination and the relay UE transmits a discovery message to recognize each other, the discovery message may include location information. The source UE may recognize whether the destination UE is present in an MCR or MCR+/−offset range through the discovery message including the location information broadcast by the destination UE. The source UE may expect an additional operation capable of raising reliability when the destination UE is within the MCR or MCR+/−offset range.

Although the source/destination/relay UE may broadcast the discovery message autonomously and periodically, the source/destination/relay UE may transmit the discovery message by solicitation of another UE. In this case, the solicitation message may include the location of a UE that transmits the message and MCR information. For example, when the relay UE solicits all neighbor UEs or specific UEs for broadcasting the discovery message, UEs out of the MCR (+/−offset) may not conform to solicitation for broadcasting the discovery message (in the case of applying the MCR). This is because the source/destination UE receiving a request for transmission of the discovery message is incapable of expecting reliable transmission through the corresponding relay UE (discovery model B).

When the relay UE broadcasts/groupcasts the discovery message including MCR information and location information thereof (discovery model A), the remote UE receiving the discovery message may not select the corresponding relay UE when the location thereof is not within the MCR (+/−offset). This is because it may be expected that a service transmitted through the relay UE will not be reliably transmitted and received or it may be determined that the service transmitted through the relay UE does not belong to a region supported by the service, when the location of the remote UE is not within the MCR (+/−offset).

In the above case, a value transmitted by the relay UE may be location information of the source UE and MCR information or may be the location thereof and a modified MCR value. The modified MCR value is used because an MCR value is reduced by the distance between the source UE and the relay UE when the relay UE transmits the location thereof instead of the location of the source UE.

When NR sidelink communication is performed, a source ID (24 bits) and a destination ID (24 bits) are dividedly transmitted in SCI and a MAC header. Specifically, the divided method is as follows. A part (16 bits) of the destination ID is transmitted through first SCI of a physical layer and the remaining part (8 bits) thereof is transmitted through the MAC header. A part (8 bits) of the source ID is transmitted through second SCI of the physical layer and the remaining part (16 bits) thereof is transmitted through the MAC header.

The above-described relay path establishment operation of FIG. 17 may be an operation established by RRC or a higher layer (IP layer). However, when actual data is transmitted after the relay path is established, how to confirm and then transmit the source ID and the destination UD during a UE-to-UE relay operation has not been described. Therefore, a method relate to how to confirm the source ID and the destination ID, establish connection, and alleviate an unnecessary relay operation, in the UE-to-UE relay operation, is proposed below.

In one embodiment, it is assumed in the UE-to-UE relay operation using sidelink that a destination MAC ID indicates a MAC ID of a final destination UE. Alternatively, the destination MAC ID may indicate a MAC ID of the relay UE according to the format of a header. The MAC ID of each of the source and destination UEs is a total of 24 bits, and in NR, the MAC ID is partially divided and transmitted in a portion of the MAC header of a MAC layer. In the following description, an L1 ID and an L2 ID represent the following values.

L1 ID: A source/destination ID capable of being recognized by the physical layer. The L1 ID means a partial ID transmitted through the SCI among the total source ID (24 bits) and total destination ID (24 bits). Specifically, the L1 ID means a destination ID (16 bits) in the first SCI and the source ID (8 bits) in the second SCI.

L2 ID: A source/destination ID capable of being recognized by the MAC layer. The L2 ID means a partial ID transmitted through the MAC header among the total source ID (24 bits) and total destination ID (24 bits). Specifically, the L2 ID means a destination ID (8 bits) and a source ID (16 bits) in the MAC header.

In the following technology, path establishment means path establishment between a relay and a UE.

As a first method, a relaying operation may be performed by confirming only the L1 ID.

Figure 18:
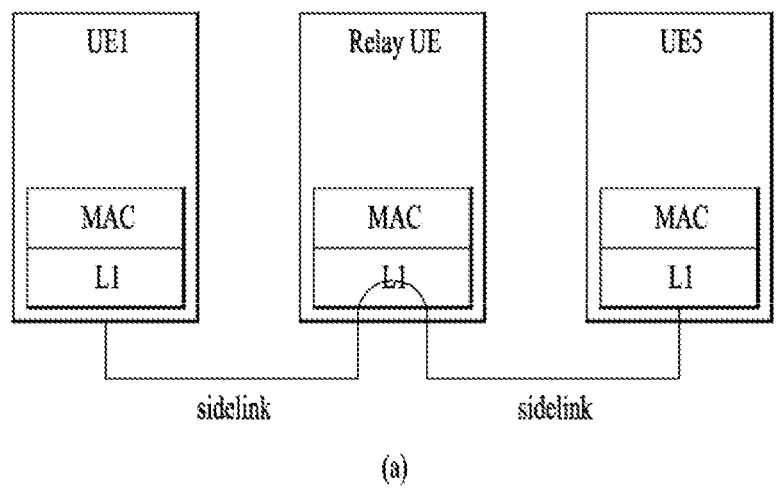
Figure 18:
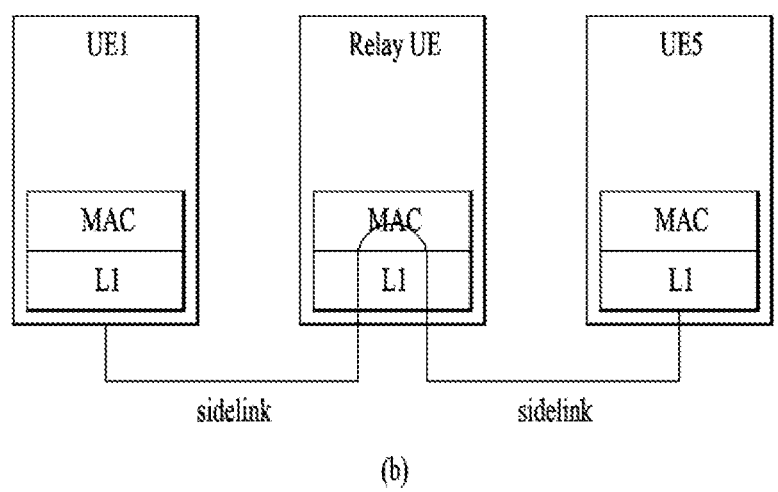

FIG. 18(a) illustrates the case in which a relay UE performs the relaying operation after confirming only the L1 ID upon operating as a relay of UE1 and UE5. When performing the relaying operation only using the L1 ID, the relay UE recognizes a source ID and a destination ID of a packet to be relayed through SCI of a radio access layer (L1 in the figure). Since the relay UE immediately performs the relaying operation after confirming the source ID and destination ID in the SCI, there is an advantage of rapidly relaying the packet. However, when a plurality of source UEs and a plurality of destination UEs having duplicated L1 IDs are present, the relay UE may perform a correct relaying operation. Since it may be expected that the relay UE will serve as relays of other multiple UEs as well as transmit a packet generated thereby, much load may occur and the relay UE may be subjected to a half duplex problem more frequently than other UEs. In this environment, occurrence of an unnecessary relaying operation caused by the duplicated L1 source IDs and destination IDs may aggravate load of the relay UE and the half duplex problem.

FIG. 18(b) illustrates the case in which a relay UE operates as a relay by confirming an L2 ID in addition to an L1 ID. To relay a packet from UE1 to UE5, the packet transmitted to the relay UE is relayed to UE5 after the L2 ID is confirmed in addition to the L1 ID at the MAC layer. Since the relay UE confirms both a source ID and a destination ID and then performs relaying, unnecessary information is prevented from being relayed and load of the relay UE may be reduced. However, a relaying time may be consumed much than relaying performed by confirming only the L1 ID.

The above proposed relaying method may differently operate according to a latency requirement (or priority) of a message. For example, when the latency requirement is tight (or has a high priority) so that the relaying operation should be performed within a short time, relaying may be performed by confirming only the L1 ID of the source/destination (SRC/DST) UE and, when the latency requirement is loose (or has a low priority), the relaying operation may be performed after checking up to the L2 ID in order to present an unnecessary message from being relayed although much time is consumed.

The above-proposed relaying methods 1 and 2 may be performed by determination of the relay UE alone. Assuming that the relay UE is a relay UE of multiple other UEs as well as a relay UE of UE1 and UE5, it may be inferred that the relay UE has a list in which source IDs and destination IDs are associated with each other therein. When the relay UE confirms/checks the list in which the source IDs and the destination IDs are associated, if there are no duplicated IDs between source L1 IDs and destination L1 IDs included in the SCI, there is little possibility that the relay UE transmits a message between a source UE and a destination UE to the source UE or the destination UE with an incorrect ID. Therefore, the relay UE may perform relaying by confirming only partial IDs included in the SCI with respect to all source IDs and destination IDs. However, when the relay UE confirms/checks the list in which the source IDs and the destination IDs are associated, if there are duplicated IDs between the source L1 IDs and the destination L1 IDs included in the SCI, the relay UE performs relaying by checking up to L2 IDs included in the MAC header.

Alternatively, the relay UE may separately configure the list of UEs having duplicated IDs transmitted through the SCI and perform relaying by checking up to the L2 IDs included in the MAC header only with respect to a message transmitted by a UE belonging to the list.

The above description has proposed a method of applying a MAC ID allocated partially to the SCI and the MAC header during a relaying operation. Although fast relaying may be performed by checking only the source MAC ID and destination MAC ID partially included in the SCI, an incorrect relaying operation (relaying of incorrect source information or relaying to an incorrect destination) may be performed. To prevent this, a method of performing relaying by confirming a full MAC ID of the source ID and the destination ID included in the SCI and the MAC header may be used. If relaying is performed by confirming only partial information included in the SCI according to priority (when latency requirement is loose) or the relay UE manages the list indicating association between source IDs and destination IDs, the method of confirming the full MAC ID only when partial MAC IDs included in the SCI are duplicated has been proposed.

Meanwhile, a transmission UE may indicate whether to filter relay data only in layer 1 or even in layer 2. For example, when a PDB of a service to be provided through relaying in terms of the transmission UE is equal to less than a predetermined value, the transmission UE may indicate, through the SCI, that filtering is performed only in layer 1. Upon receiving this indication, the relay UE immediately performs a relaying operation when filtering is performed only in layer 1. The UE-to-UE relay operation has mainly been described hereinabove.

Referring back to FIG. 11, the following problems may arise in the UE-to-UE path establishment procedure. While UE1 establishes a path with a relay UE that is considered most proper by determination of UE1 for communication with UE5, UE5 may also establish a path with a relay UE that is considered most proper by determination of UE5 for communication with UE1. In this process, there is possibility that UE1 and UE5 select different relay UEs. When different relay UEs are selected for communication through a relay between the source UE and the destination UE, an unexpected problem may occur in which a higher layer establishes a session in a duplicated way. Therefore, an embodiment described below proposes a method of preventing UEs that desire to perform mutual communication from selecting different relay UEs while a UE-to-UE relay operation is performed.

As a first method, a candidate relay UE receiving a relay request message from a source UE disregards the relay request message upon receiving another relay request from a destination UE with an ID included in the relay request message.

Figure 19:
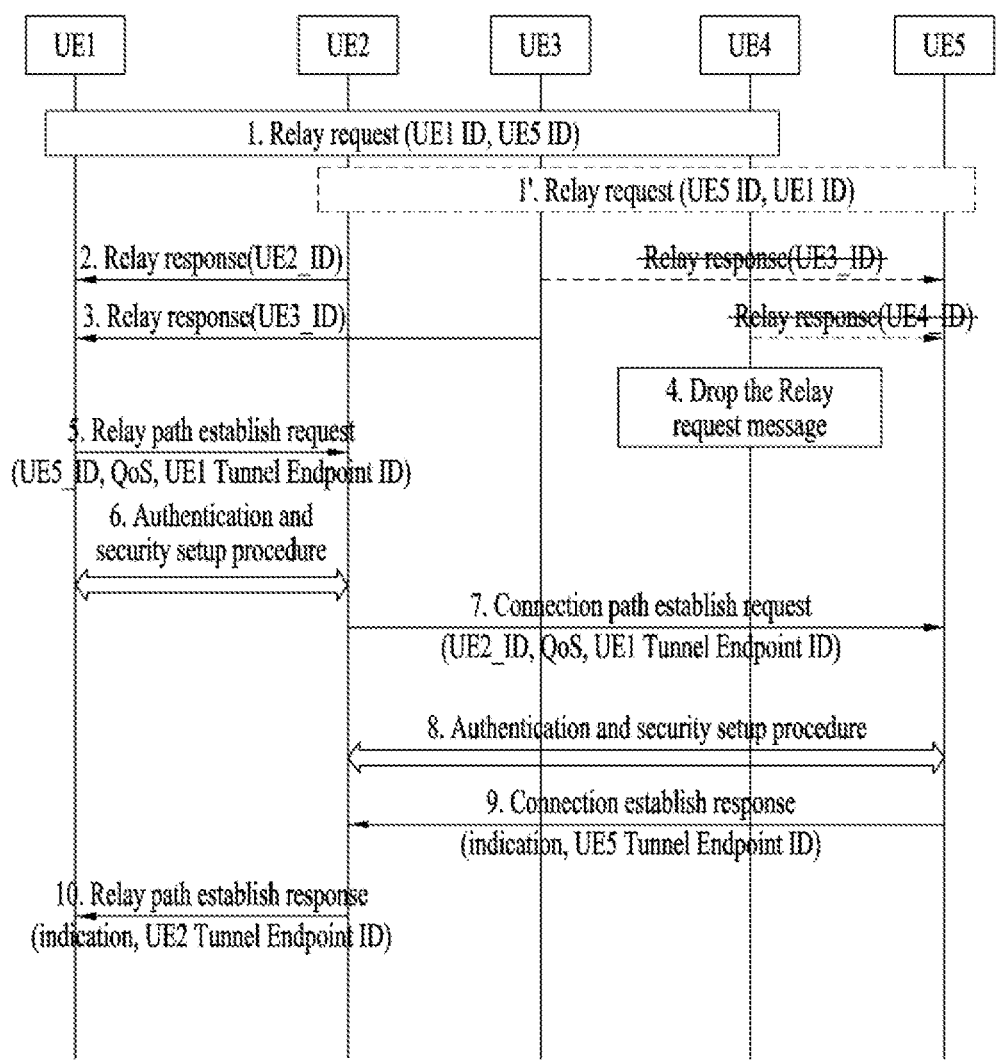

For example, in FIG. 19, UE1 may broadcast a relay request message 1 including an ID thereof (UE1 ID) and an ID of a destination UE (UE5 ID) for communication with UE5. In a similar occasion or in a situation in which UE1 has not yet determined a relay UE for communication with UE5, UE5 may transmit a relay request message 1' including an ID thereof (UE5 ID) and an ID of the destination UE (UE1 ID) for communication with UE1. In FIG. 19, while the relay request message 1' transmitted by UE5 is denoted for convenience after the relay request message 1, the relay request message 1' may be transmitted, in an actual meaning, in all durations until UE1 completes relay path establishment 10 with a specific candidate relay UE, including the illustrated case. In this case, when a UE corresponding to a destination/target ID of the relay request message which has already been received by candidate relay UEs broadcasts a relay request message (i.e., when the candidate relay UEs receive a relay request message including both the source ID and the destination ID included in the previously received relay request), the candidate relay UEs may not transmit a response message even in a situation in which the candidate relay UEs may transmit the relay response. A time duration in which the response message is not transmitted means a duration until UE1 that has transmitted the relay request first establishes a path with a specific UE for communication with UE5.

In this operation, in FIG. 19, UE1 that has broadcast the relay request message first selects the most appropriate UE from among candidate relay UEs that have transmitted a relay response message and performs unicast communication from a time point when UE1 transmits a relay path establishment request 5. Therefore, the other candidate relay UEs are unaware that UE1 establishes a path for relaying with a specific UE and this makes it difficult to determine by when the candidate relay UEs should not respond to the relay request 1' of UE5. To solve this problem, in a proposed method, candidate relay UEs that have received a relay request (UE1 ID, UE5 ID) message from an initiating UE UE1 may set a timer and may not transmit the relay response message to UE5 until the timer expires although UE5 transmits a relay request (UE5 ID, UE1 ID) message for the same communication purpose. The timer may be differently set according to priority of a message to be transmitted. To this end, the relay request message transmitted by the initiating UE UE1 may need to include priority of a message transmitted through a relay UE. The timer may be preset or be set through higher layer signaling or physical layer signaling.

When the corresponding method is applied, there is a disadvantage that UE5 may continue to broadcast an unnecessary relay request (UE5 ID, UE1 ID) while UE5 has no response.

Figure 20:
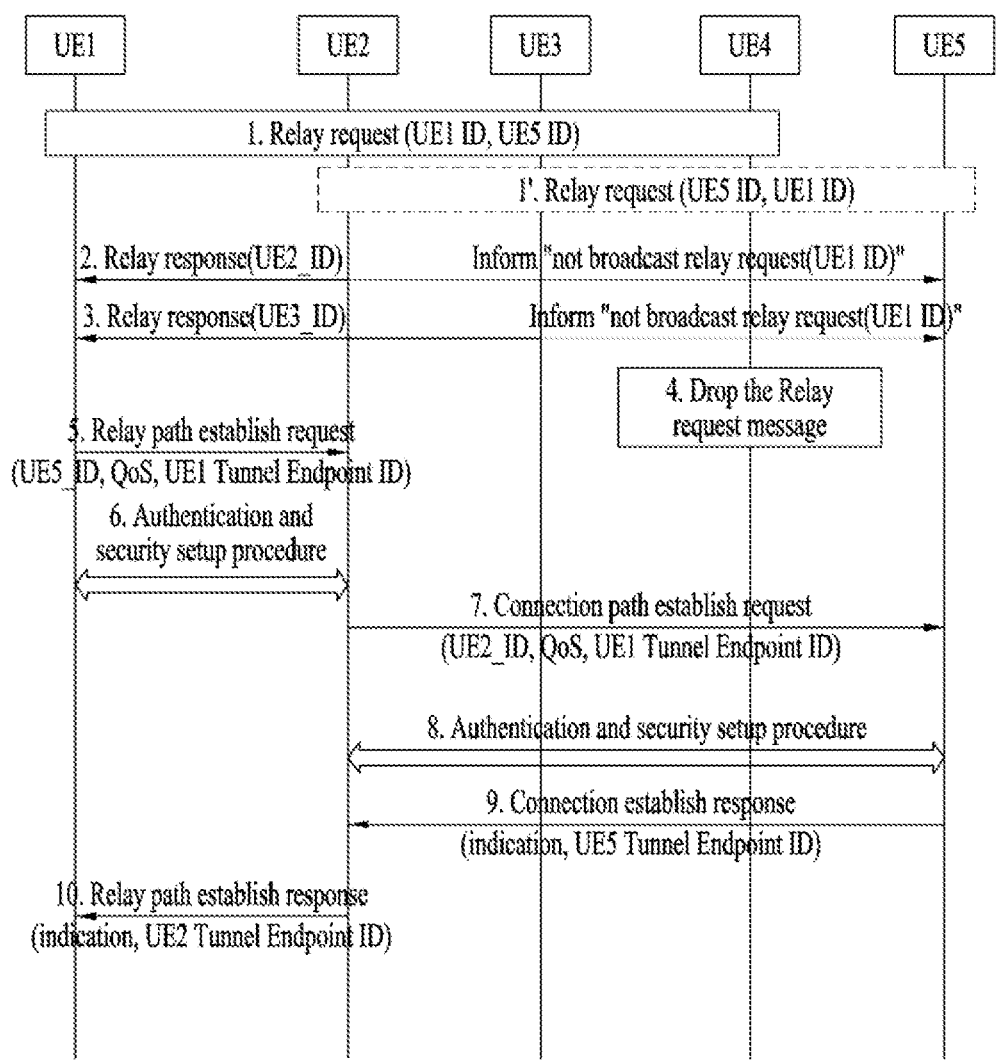
Figure 21:
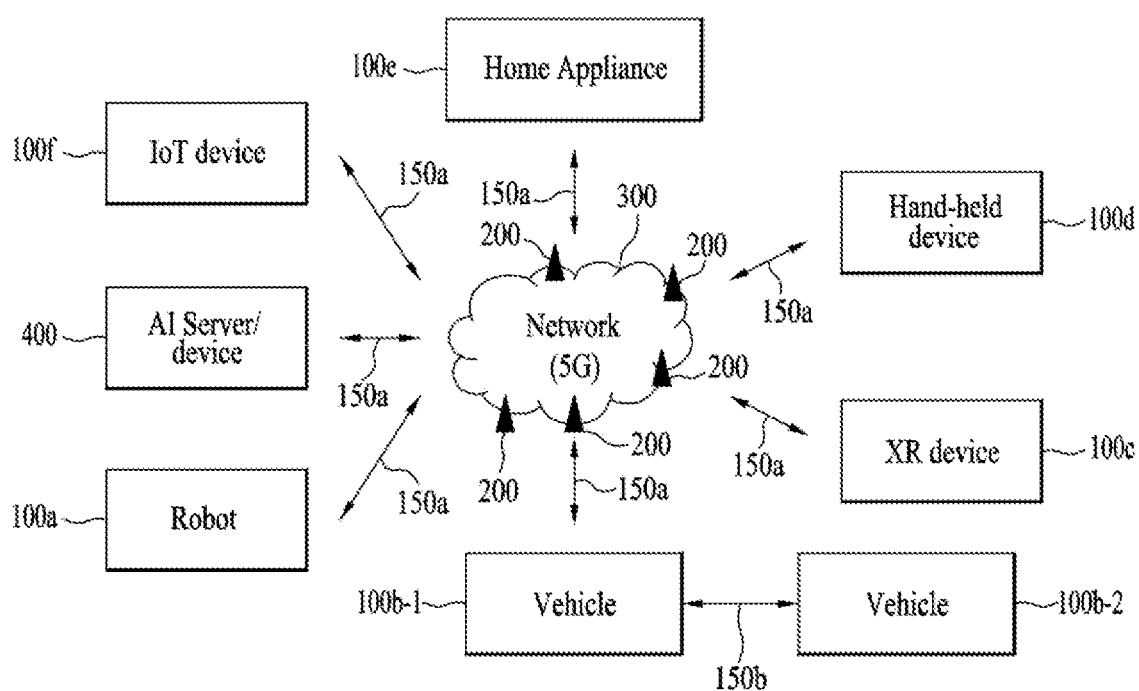
FIGS. 21 to 27 are diagrams illustrating various devices to which embodiment(s) are applicable.

As a second method, a candidate relay UE that has received the relay request from a source UE transmits a message including "not broadcast relay request message" to a destination UE included in the relay request. For example, as illustrated in FIG. 20, when UE1 broadcasts a relay request (UE1 ID, UE5 ID) message, candidate relay UEs UE2 and UE3 may transmit a relay response to UE1 when it is determined that the candidate relay UEs become proper relay UEs. In this case, a candidate relay UE transmitting the relay response may transmit a message indicating that the relay request for communication with UE1 should not be transmitted to the destination UE UE5. Upon receiving this message, UE5 may not transmit a relay request (ID5, ID1) message for a predetermined time. The predetermined time may be a previously scheduled duration length. If a connection path establishment request message is not transmitted by a specific relay UE even after the predetermined time elapses, UE5 may broadcast again the relay request (UE5, UE1) message for communication with UE1. The predetermined time may be preset or be set through higher layer signaling or physical layer signaling.

As a third method, a source UE and a destination UE that desires to perform relay communication may implicitly/explicitly determine who will broadcast a relay request message through direct connection. There is a possibility that two UEs (e.g., UE1 and UE5) that desire to perform mutual communication are directly connected in a low modulation and coding scheme (MCS). If it is desired to perform relay communication for higher transmission rate and enhanced reliability, UEs may implicitly or explicitly determine the role of each other before selecting a relay UE.

For example, UE1 may explicitly inform a peer UE that UE1 will operate as a source UE through a message. The UE operating as the source UE has capability to select a relay UE by broadcasting a relay request message. In this case, whether UE1 will operate as the source UE may be broadcast by being included in a discovery message.

Alternatively, there may be previous implicit agreement so that a UE broadcasting the discovery message to serve to always select a relay UE. According to a discovery message transmission scheme, a UE requesting the discovery message and a UE broadcasting the discovery message according to the request of the discovery message may be present. A UE that performs a specific role (request the discovery message/broadcast the discovery message) may be determined to serve to always select the relay UE.

The above embodiment has provided a method of causing UEs that desire to perform mutual communication through relaying not to select different relay UEs in a process of searching for a relay UE. This proposal indicates who will select a relay UE or causes only a specific UE to select a relay UE so that use of unnecessary resources or communication performed by selecting different relay UEs may be prevented.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
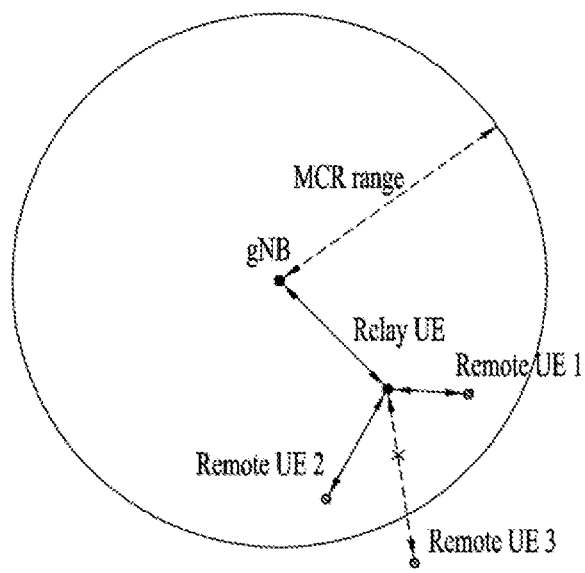
Figure 13:
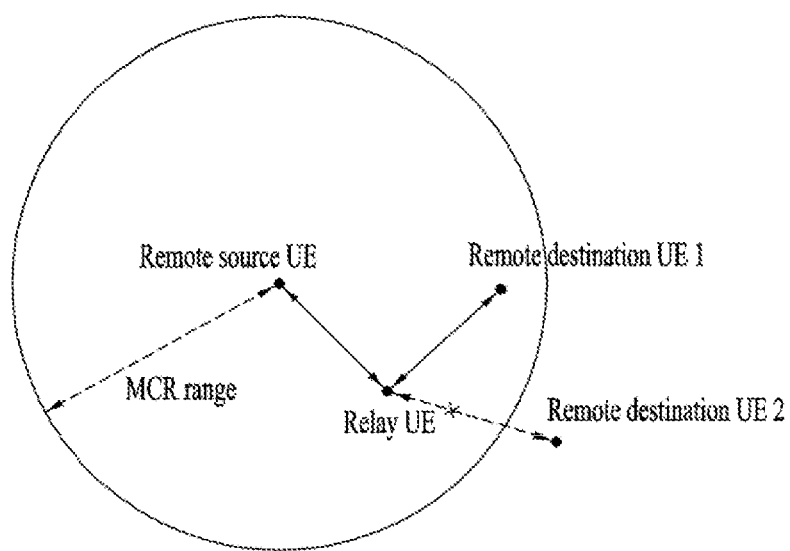

FIG. 13 illustrates a communication system 1 applied to the present disclosure.

Referring to FIG. 13, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BS s/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 22:
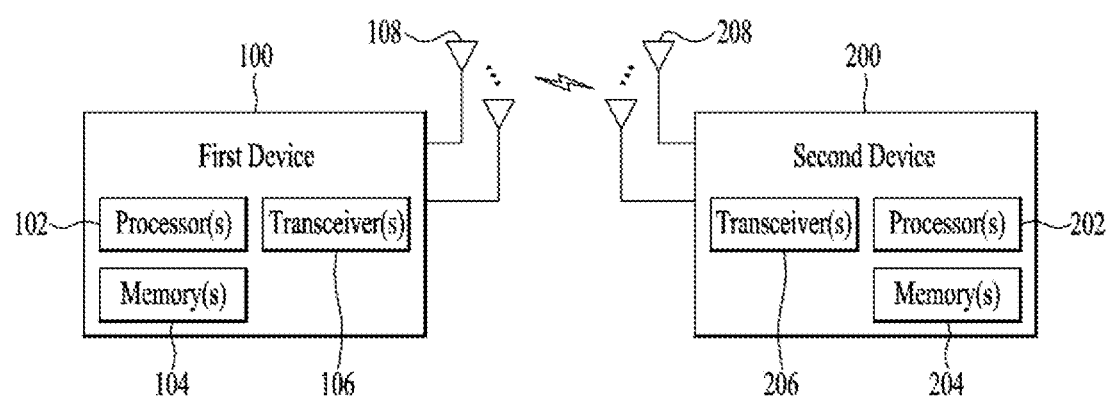

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
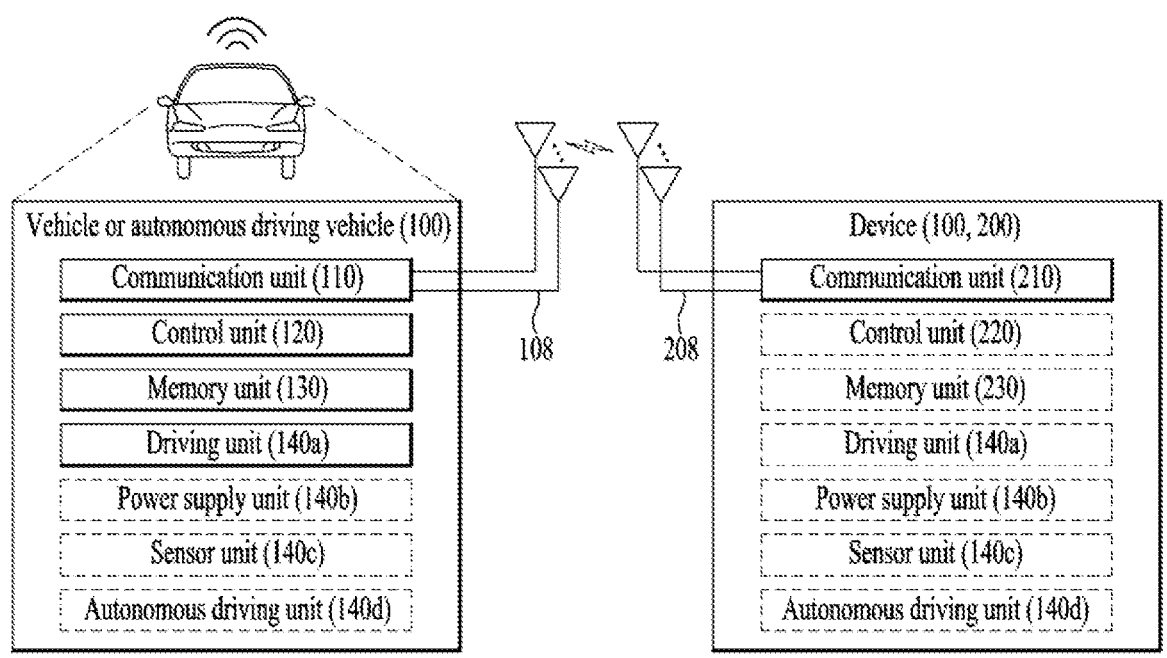

Examples of a Vehicle or an Autonomous Driving Vehicle Applicable to the Present Disclosure FIG. 23 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 24:
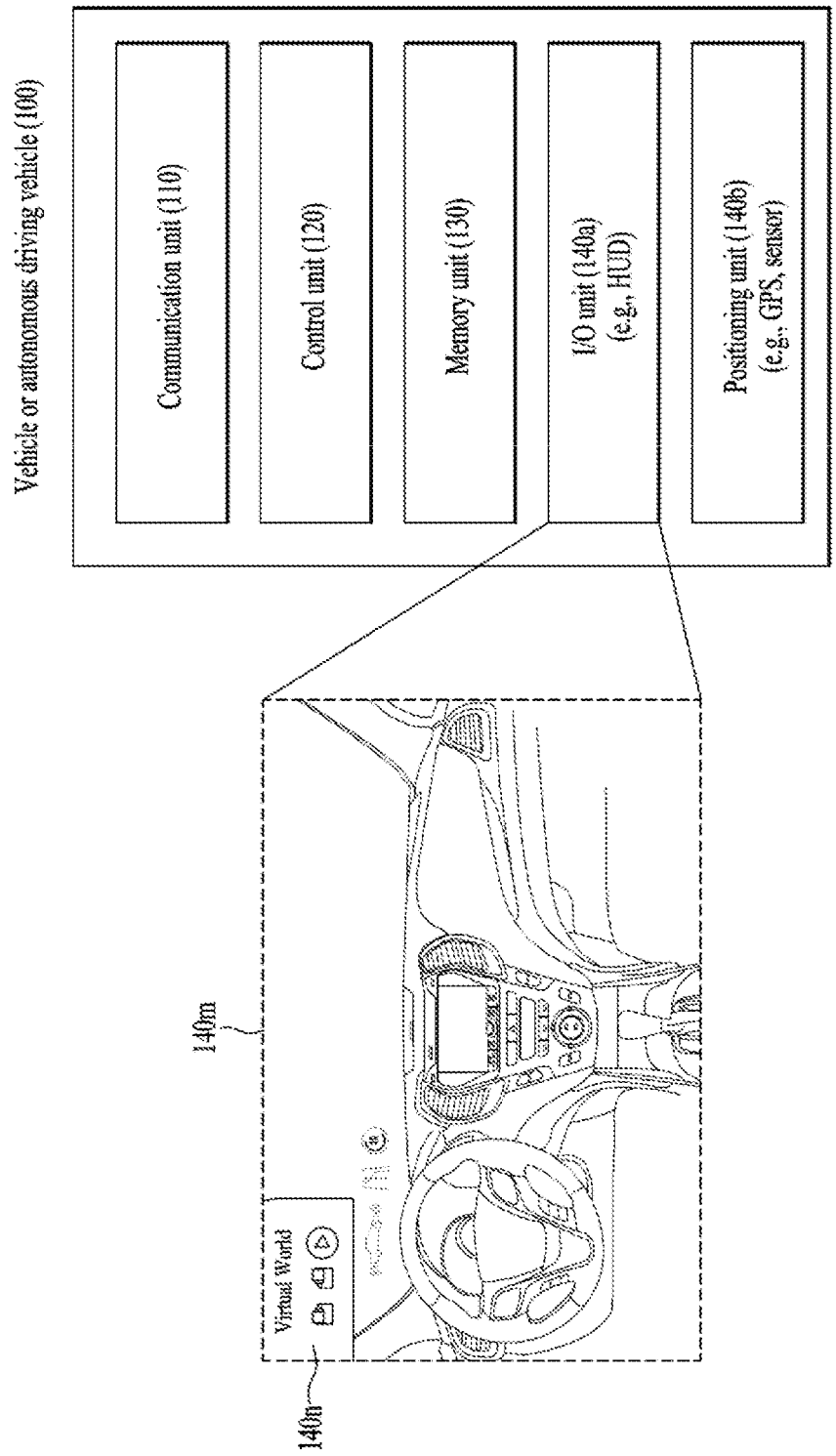

FIG. 24 illustrates a vehicle applied to the present disclosure. The vehicle may be implemented as a transport means, an aerial vehicle, a ship, etc.

Referring to FIG. 24, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 25:
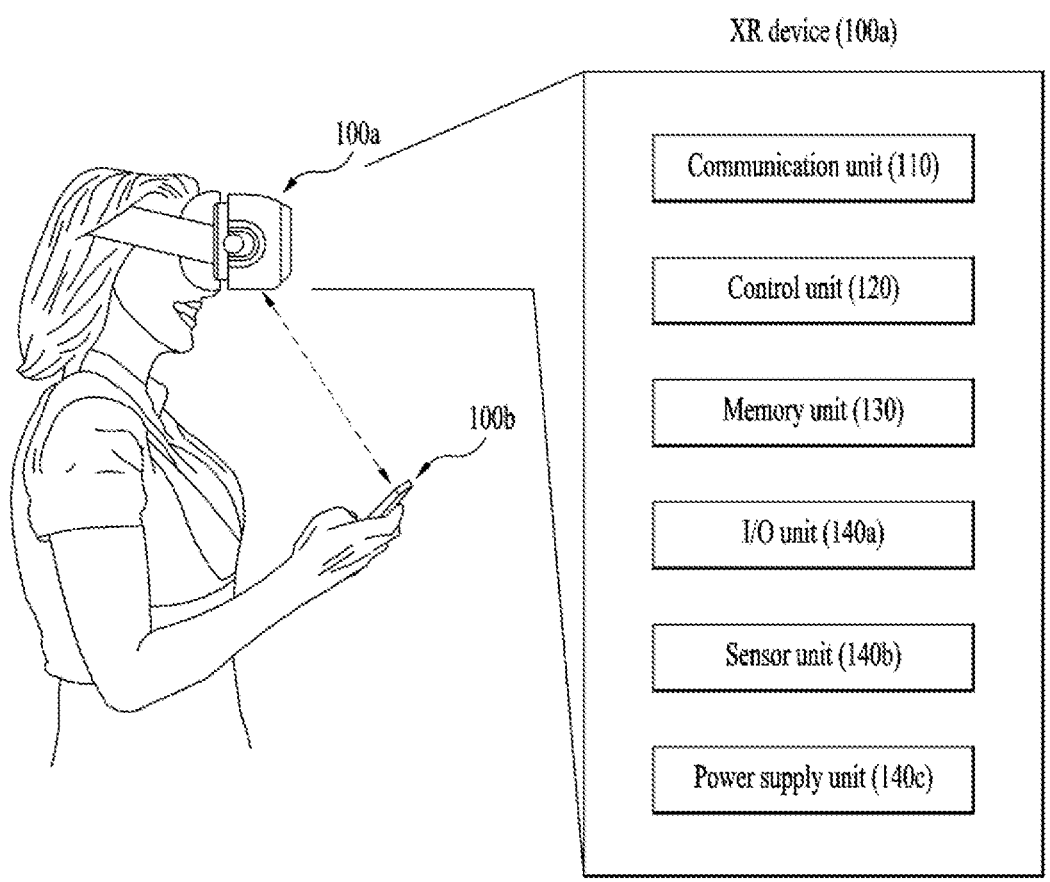

FIG. 25 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 25, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit unit 120 transmits content request information to another device (e.g., a hand-held device 100*b*) or a media server through the communication unit unit 130. The communication unit unit 130 may download/stream content such as films or news from another device (e.g., the hand-held device 100*b*) or the media server to the memory unit 130. The control unit unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 26:
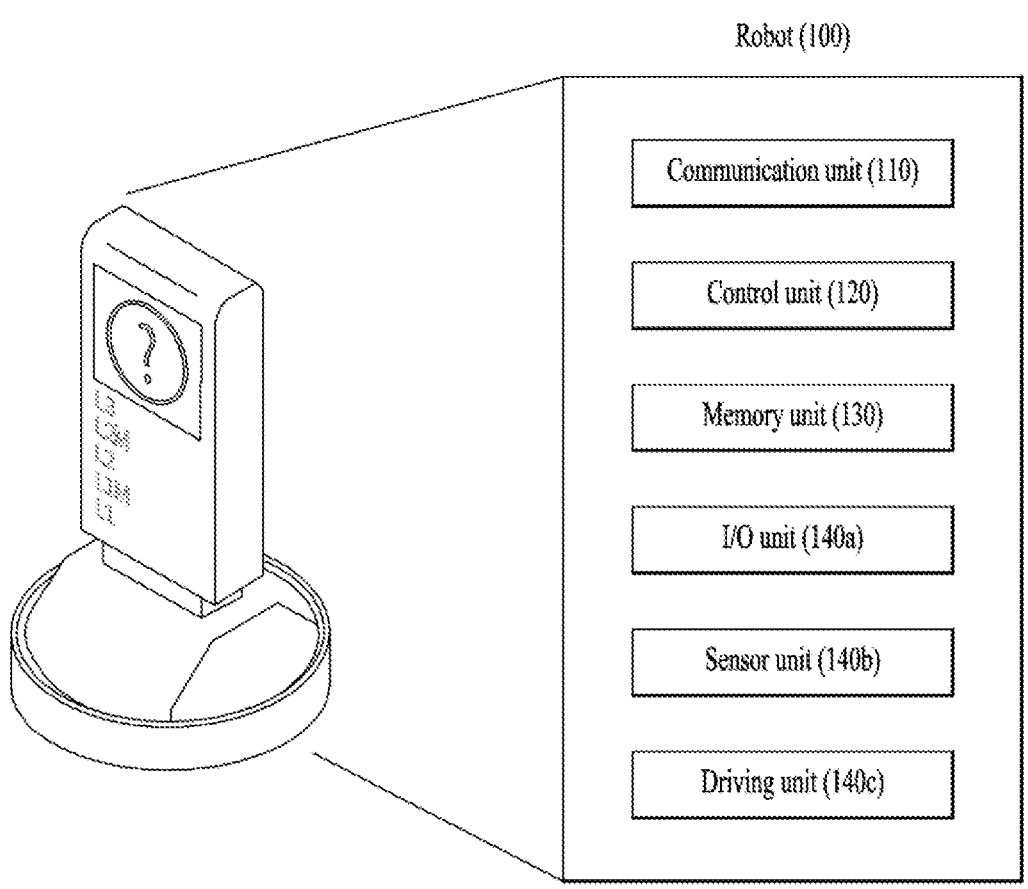

FIG. 26 illustrates a robot applied to the present disclosure. The robot may be categorized into an industrial robot, a medical robot, a household robot, a military robot, etc., according to a used purpose or field.

Referring to FIG. 26, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 22, respectively.

The communication unit 110 may transmit and receive signals (e.g., driving information and control signals) to and from external devices such as other wireless devices, other robots, or control servers. The control unit unit 120 may perform various operations by controlling constituent elements of the robot 100. The memory unit unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI Device to which the Present Disclosure is Applied.

Figure 27:
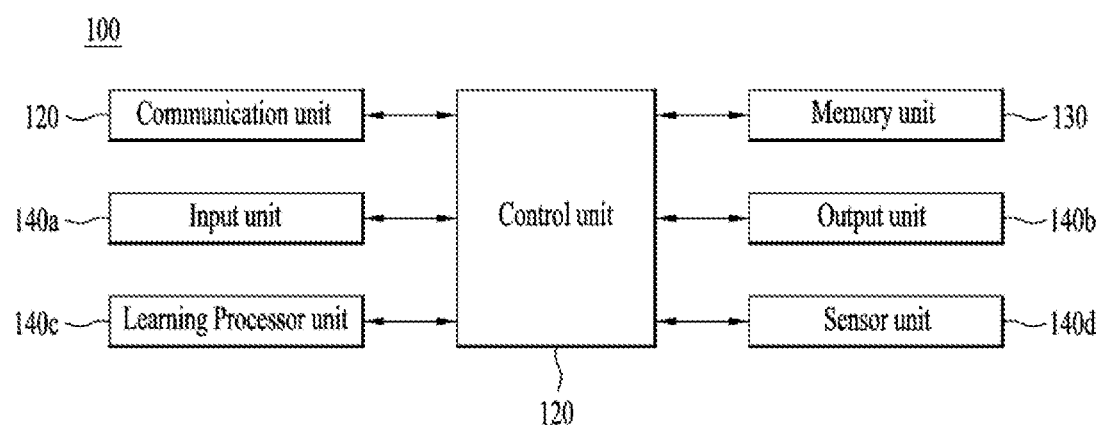

FIG. 27 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 27, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 22, respectively.

The communication unit 110 may transmit and receive wired/radio signals (e.g., sensor information, user input, learning models, or control signals) to and from external devices such as other AI devices (e.g., 100*x*, 200, or 400 of FIG. 13) or an AI server (e.g., 400 of FIG. 13) using wired/wireless communication technology. To this end, the communication unit 110 may transmit information within the memory unit unit 130 to an external device and transmit a signal received from the external device to the memory unit 130.

The control unit unit 120 may determine at least one feasible operation of the AI device 100, based on information which is determined or generated using a data analysis algorithm or a machine learning algorithm. The control unit unit 120 may perform an operation determined by controlling constituent elements of the AI device 100. For example, the control unit unit 120 may request, search, receive, or use data of the learning processor unit 140*c* or the memory unit unit 130 and control the constituent elements of the AI device 100 to perform a predicted operation or an operation determined to be preferred among at least one feasible operation. The control unit unit 120 may collect history information including the operation contents of the AI device 100 and operation feedback by a user and store the collected information in the memory unit unit 130 or the learning processor unit 140*c* or transmit the collected information to an external device such as an AI server (400 of FIG. 13). The collected history information may be used to update a learning model.

The memory unit unit 130 may store data for supporting various functions of the AI device 100. For example, the memory unit unit 130 may store data obtained from the input unit 140*a*, data obtained from the communication unit 110, output data of the learning processor unit 140*c*, and data obtained from the sensor unit 140. The memory unit unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 13). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

What is claimed is:

1. An operation method of a remote user equipment (UE) in a wireless communication system, the operation method comprising:
   receiving at least one discovery message by the remote UE; and
   selecting a relay UE based on the at least one discovery message,
   wherein the discovery message includes information related to a minimum communication range (MCR) of a source UE, and
   wherein the remote UE is included in the MCR, and the selected relay UE has a signal strength equal to or greater than a preset value and is included in the MCR.

2. The operation method of claim 1, wherein the discovery message includes information about a location of one of the source UE and a base station.

3. The operation method of claim 1, wherein the remote UE preferentially selects a relay UE located at a position obtained by applying a predetermined offset to half of the MCR.

4. The operation method of claim 1, wherein the discovery message includes information indicating that the MCR is applied to the discovery message, and the remote UE skips transmission of the discovery message to a higher layer.

5. The operation method of claim 1, wherein the remote UE transmits only negative acknowledgement (NACK) among acknowledgement (ACK) and NACK based on the remote UE belonging to the MCR and skips transmission of both ACK and NACK based on the remote UE being out of the MCR.

6. The operation method of claim 1, wherein the MCR is configured on a service basis.

7. A remote user equipment (UE) in a wireless communication system, the remote UE comprising:
   at least one processor; and
   at least one computer memory operably connectable to the at least one processor and storing instructions that, when executed, cause the at least one processor to perform operations,
   wherein the operations comprise:
   receiving at least one discovery message; and
   selecting a relay UE based on the at least one discovery message,
   wherein the discovery message includes information related to a minimum communication range (MCR) of a source UE, and
   wherein the remote UE is included in the MCR, and the selected relay UE has a signal strength equal to or greater than a preset value and is included in the MCR.

8. The remote UE claim 7, wherein the discovery message includes information about a location of the source UE.

9. The remote UE of claim 7, wherein the remote UE preferentially selects a relay UE located at a position obtained by applying a predetermined offset to half of the MCR.

10. The remote UE of claim 7, wherein the discovery message includes information indicating that the MCR is applied to the discovery message, and the remote UE skips transmission of the discovery message to a higher layer.

11. The remote UE of claim 7, wherein the remote UE transmits only negative acknowledgement (NACK) among acknowledgement (ACK) and NACK based on the remote UE belonging to the MCR and skips transmission of both ACK and NACK based on the remote UE being out of the MCR.

12. The remote UE of claim 7, wherein the MCR is configured on a service basis.

13. A processor for performing operations for a remote user equipment (UE) in a wireless communication system, the operations comprise:
   receiving at least one discovery message; and
   selecting a relay UE based on the at least one discovery message,
   wherein the discovery message includes information related to a minimum communication range (MCR) of a source UE, and
   wherein the remote UE is included in the MCR, and the selected relay UE has a signal strength equal to or greater than a preset value and is included in the MCR.

14. A non-volatile computer readable storage medium storing at least one computer program including instructions that, when executed by at least one processor, cause the at least one processor to perform operations for a user equipment (UE), the operations comprising:
   receiving at least one discovery message; and
   selecting a relay UE based on the at least one discovery message,
   wherein the discovery message includes information related to a minimum communication range (MCR) of a source UE, and
   wherein the remote UE is included in the MCR, and the selected relay UE has a signal strength equal to or greater than a preset value and is included in the MCR.

* * * * *